United States Patent
Liu et al.

(10) Patent No.: US 11,873,413 B2
(45) Date of Patent: Jan. 16, 2024

(54) UV-SINTERABLE MOLECULAR INK AND PROCESSING THEREOF USING BROAD SPECTRUM UV LIGHT

(71) Applicant: National Research Council of Canada, Ottawa (CA)

(72) Inventors: Xiangyang Liu, Nepean (CA); Jianfu Ding, Ottawa (CA); Patrick Roland Lucien Malenfant, Orleans (CA); Chantal Paquet, Ottawa (CA); Bhavana Deore, Ottawa (CA); Arnold J. Kell, Ottawa (CA)

(*) Notice: Subject to any disclaimer, the term of this patent is extended or adjusted under 35 U.S.C. 154(b) by 0 days.

(21) Appl. No.: 17/265,572

(22) PCT Filed: Aug. 2, 2019

(86) PCT No.: PCT/IB2019/056612
§ 371 (c)(1),
(2) Date: Feb. 3, 2021

(87) PCT Pub. No.: WO2020/026207
PCT Pub. Date: Feb. 6, 2020

(65) Prior Publication Data
US 2021/0301166 A1    Sep. 30, 2021

Related U.S. Application Data

(60) Provisional application No. 62/714,363, filed on Aug. 3, 2018.

(51) Int. Cl.
C09D 11/52    (2014.01)
C09D 11/033    (2014.01)
(Continued)

(52) U.S. Cl.
CPC ............ C09D 11/52 (2013.01); C09D 11/033 (2013.01); C09D 11/101 (2013.01); H01B 1/22 (2013.01)

(58) Field of Classification Search
CPC ....................................................... C09D 11/52
See application file for complete search history.

(56) References Cited

U.S. PATENT DOCUMENTS 3,989,644 A    11/1976    Bolon et al.
4,088,801 A    5/1978    Bolon et al.
(Continued)

FOREIGN PATENT DOCUMENTS

CN    101271929 A    9/2008
CN    102618033 A    8/2012
(Continued)

OTHER PUBLICATIONS

International Search Report and Written Opinion dated Dec. 5, 2019 on PCT/IB2019/056612.

(Continued)

*Primary Examiner* — William D Young
(74) *Attorney, Agent, or Firm* — Brunet & Co. Ltd.; Hans Koenig; Robert Brunet

(57) ABSTRACT

A printable molecular ink that is can be treated (e.g. dried or curable) and sintered using broad spectrum ultraviolet light is provided to produce electrically conductive traces on a low temperature substrate, for example PET. The ink includes a silver or copper carboxylate, an organic amine compound, and may include a thermal protecting agent.

6 Claims, 18 Drawing Sheets

(51) Int. Cl.
  C09D 11/101    (2014.01)
  H01B 1/22      (2006.01)

(56) References Cited

U.S. PATENT DOCUMENTS

| | | | |
|---|---|---|---|
| 5,527,627 A * | 6/1996 | Lautzenhiser | H01L 23/3735 |
| | | | 428/209 |
| 7,141,104 B2 | 11/2006 | De Voeght et al. | |
| 2003/0180451 A1 * | 9/2003 | Kodas | H05K 3/105 |
| | | | 427/123 |
| 2006/0000172 A1 | 1/2006 | Kodas et al. | |
| 2009/0148600 A1 * | 6/2009 | Li | B22F 1/0022 |
| | | | 427/256 |
| 2011/0175040 A1 | 7/2011 | Sakaguchi et al. | |
| 2013/0118786 A1 * | 5/2013 | Chung | C23C 18/08 |
| | | | 174/257 |
| 2014/0178601 A1 | 6/2014 | Wei et al. | |
| 2014/0346412 A1 | 11/2014 | Okamoto et al. | |
| 2015/0004325 A1 | 1/2015 | Walker et al. | |

FOREIGN PATENT DOCUMENTS

| | | |
|---|---|---|
| CN | 103189928 A | 7/2013 |
| CN | 104284952 A | 1/2015 |
| CN | 104341860 A | 2/2015 |
| CN | 106700735 A | 5/2017 |
| CN | 106752381 A | 5/2017 |
| JP | 2007194175 A | 8/2007 |
| JP | 2012018957 A | 1/2012 |
| JP | 2014529875 A | 11/2014 |
| JP | 2015508434 A | 3/2015 |
| JP | 2016113635 A | 6/2016 |
| JP | 2018069187 A | 5/2018 |
| KR | 20170019157 A | 2/2017 |
| TW | 201815994 A | 5/2018 |
| WO | 2012/114925 A1 | 8/2012 |
| WO | 2013/036519 A1 | 3/2013 |
| WO | 2018/018136 A1 | 2/2018 |
| WO | 2018/146616 A2 | 8/2018 |

OTHER PUBLICATIONS

Datta S, et al. Effect of Composition Variables on the UV Curing Behavior of Conductive Ink Formulations. UV & EB Technol. Expo Conf., Tech. Conf. Proc., 2008.
Kell A, et al. ACS Appl. Mater. Interfaces 2017, 9, 17226-17237.
Gu L, et al. (2014) Applied Mechanics and Materials. vol. 469, pp. 51-54.
Henkel Corporation (2013) Printed Electronic Inks F LR615251 Updated.
Pacioni NL, et al. Synthetic Routes for the Preparation of Silver Nanoparticles. In the Fabrication and Design of Medical and Biosensing Devices, E.I. Alarcon et al. (eds.). (Springer International Publishing Switzerland 2015, pp. 13-46).
Polzinger B, et al. UV-Sintering of Inkjet-Printed Conductive Silver Tracks. 11th IEEE International Conference on Nanotechnology, Aug. 15-18, 2011, Portland, Oregon, USA.
Rajan K, et al. Nanotechnology, Science and Applications 2016, 9, 1-13.
Sakamoto M, et al. Journal of Photochemistry and Photobiology C: Photochemistry Reviews 10 (2009) 33-56.
Zhai D, et al. Colloids and Surfaces A: Physicochem. Eng. Aspects 424 (2013) 1-9.
Cao X, et al. ACS Nano. (2014) 8:12, 12769-12776.
Chang Y, et al. J. Mater. Chem. (2012) 22, 25296.
Dong Y, et al. Thin Solid Films. 589 (2015) 381-387.
Hoenig R, et al. Solar Energy Materials & Solar Cells. (2012) 106, 7-10.
Liang J, et al. Adv. Mater. (2016) 28, 5986-5996.
Nie X, et al. Applied Surface Science. (2012) 261, 554-560.
Ostfeld A, et al. Scientific Reports, (2015) 5:15959.
Paquet C, et al. Chem. Commun. (2016) 52, 2605.
Paquet C, et al. Nanoscale. (2018) 10, 6911.
Salmeron J, et al. Journal of Electronic Materials. (2014) 43(2), 604-617.
Vaseem M, et al. ACS Appl. Mater. Interfaces. (2016) 8, 177-186.
Walker SB, et al. J. Am. Chem.Soc. (2012) 134, 1419-1421.
Office Action dated Apr. 6, 2022 on Chinese application 2019800644777. Cover page is translated.
Supplementary Partial European Search Report dated Apr. 7, 2022 on European application 19844170.1.
First examination report on Indian patent application 202127004798.
Extended European Search Report dated Jun. 23, 2022 on European application 19844170.1.
Office action dated Dec. 23, 2022 on Chinese application 2019800644777.
Office action dated Mar. 16, 2023 on Taiwan application 108127562.
Office action dated Feb. 21, 2023 on Japanese application 2021-505856.
Office action dated May 10, 2023 on European application 19844170.1.
Abu-Zied BM, et al. Thermochimica Acta 581 (2014) 110-117.
Cano-Raya C, et al. Applied Materials Today 15 (2019) 416-430.
Zhang Y, et al. Journal of Energy Chemistry 63 (2021) 498-513.
Office action dated Aug. 29, 2023 on Chinese application 2019800644777.

* cited by examiner 4-7 Ω/□

UV-SINTERABLE MOLECULAR INK AND PROCESSING THEREOF USING BROAD SPECTRUM UV LIGHT

FIELD

This application relates to conductive inks, particularly to conductive molecular inks that can be treated and sintered with broad spectrum ultraviolet (UV) light. The application also relates to processes for treating and sintering molecular inks using broad spectrum UV light.

BACKGROUND

The majority of conductive inks utilized by the printed electronics (PE) manufacturing community utilize thermal processing to convert flake-based or nanoparticle-based traces into conductive metal traces. In a typical manufacturing environment with a sheet-to-sheet flat-bed screen printer and a tunnel oven, thermal processing can be slow (e.g. 5-30 minutes), but as printable electronics moves to roll-to-roll processes faster processing times will be required (e.g. under 5 minutes).

The most common means of decreasing the time required for sintering of conductive traces is to utilize intense pulsed light (IPL) or photonic sintering (PS) techniques (hereafter referred to as IPL sintering), where processing times can be as low as microseconds to seconds. This is due to the ability for IPL processing to rapidly and selectively sinter inks through the use of intense pulses of UV light that generate significant localized heat within the traces.

Though IPL methods allow for rapid processing of silver and copper nanoparticle inks as well as copper and silver-based molecular inks, the technique is best suited for high temperature substrates such as Kapton™ because the localized heating required for processing of most of these inks requires sufficient energy that the properties of the underlying substrate is also affected. In particular, when using a low temperature substrate such as polyethylene terephthalate (PET) substrates, IPL sintering tends to warp/deform, the substrate under the printed ink traces and in many cases the traces actually melt or submerge into the substrate. In addition, IPL processed traces are typically quite porous whereas those processed through thermal sintering are much denser and uniform.

As such, there remains a need for printable inks that can be treated (e.g. dried or cured) and sintered using broad spectrum UV light to produce electrically conductive traces on a low temperature substrate while reducing or eliminating damage to the substrate.

SUMMARY

The use of broad spectrum UV light processing for the treatment (drying or curing) and sintering of printed non-conductive metal traces offers the opportunity to realize new efficiencies for roll to roll printable electronic manufacturing and other manufacturing approaches which seek to decrease processing times. Low temperature molecular inks are advantageously treated and sintered using broad spectrum UV light because such inks can be manipulated to provide functionally effective conductive traces of a wide range of thicknesses and widths for a wide variety of applications. For example, such inks may be dried and sintered to form a conductive trace that is relatively thin and/or narrow, while maintaining relatively high conductivity (i.e. relatively low resistivity).

In one aspect, there is provided an ink comprising: a silver carboxylate or a copper carboxylate; an organic amine compound; and, a thermal protecting agent.

In one embodiment, the silver carboxylate is a $C_{1-10}$ alkanoate. In another embodiment the copper carboxylate is a $C_{1-12}$ alkanoate. In a further embodiment the silver or copper carboxylate has a decomposition temperature of 160° C. or less. In yet a further embodiment the organic amine compound is an amino alcohol. In still another embodiment the thermal protecting agent comprises a conjugated polymer, a polyether, a fatty acid or any mixture thereof.

In another aspect there is provided an ink comprising a silver carboxylate or copper carboxylate and an organic amine compound, the ink self-limiting a temperature increase in the ink during sintering to an ink temperature high enough to decompose the ink, whereby the temperature increase is localized to an area of a substrate that is occupied by the ink. In one embodiment, sintering is performed using broad band UV light. In another embodiment, the ink optionally includes a thermal protecting agent. In a further embodiment, the organic amine compound is an amino alcohol.

The use of other agents such as a binder and/or a surface tension modifier when added to the inks of the present disclosure enhance the mechanical properties (e.g. adhesion) of the resulting printed traces pre- and post-sintering, depending on the desired approach to manufacturing substrates with conductive metal traces for electronic devices. In an embodiment, the ink is a molecular ink. In related embodiment, the molecular ink comprises a silver carboxylate or copper carboxylate, an organic amine compound, and one or more components selected from the group consisting of a binder, a solvent, a surface tension modifier, a defoaming agent, a thixotropy modifying agent, and a filler. In another related embodiment, the ink comprises a copper carboxylate and an amino alcohol, a copper nanoparticle filler and a binder.

Advantageously, the ink of the present invention can be printed on a low temperature substrate and sintered using broad spectrum UV light to produce electrically conductive traces on the low temperature substrate while reducing or eliminating damage to the substrate. The conductive traces produced by sintering the ink with broad spectrum UV light have trace morphologies similar to those of thermally processed samples and have excellent electrical properties. Prior to producing conductive traces, broad spectrum UV light can also be used to treat the printed ink on a low temperature substrate to improve the quality (e.g. reduced cracking) of the resulting conductive trace following thermoforming and sintering. When UV light is used to "treat" a printed trace, or when a printed ink is UV "treated" or subjected to a UV "treatment" as disclosed herein, it is understood that the treatment (whether or not it can also be characterized as drying or curing) falls short of producing a conductive trace suited for its intended application. This is distinguished from the process of UV curing to the point of sintering as disclosed herein, which does give rise to conductive traces.

In another aspect, there is provided a process for producing an electrically conductive silver or copper trace on a substrate, the process comprising: depositing an ink comprising a silver carboxylate or a copper carboxylate and an organic amine compound, on a substrate to form a trace of the ink on the substrate; and, sintering the trace on the substrate with broad spectrum UV light to form the electrically conductive silver trace on the substrate. Advantageously, the process can be used to form electrically conductive traces on the substrate using broad spectrum UV light. The conductive traces produced by sintering the ink with broad spectrum UV light have trace morphologies similar to those of thermally processed samples and have excellent electrical properties, which can be further improved if prior to thermoforming or sintering, inks deposited (e.g. printed) onto a substrate are treated using broad spectrum UV light.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1A:
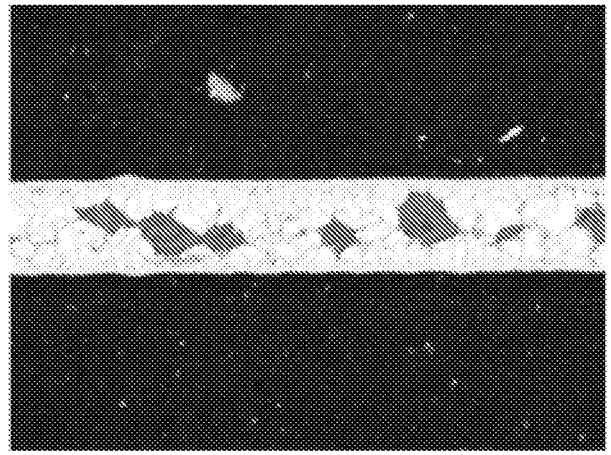
FIG. 1A depicts a trace on PET produced from ink (C1) having no thermal protecting agent following UV sintering using a DYMAX™ 5000-EC Series UV Curing Flood Lamp system at a distance of 10 cm from the bulb for 4.5 minutes.

In one aspect, the use of a thermal protecting agent in an ink provides an ink that is both printable and sinterable with broad spectrum ultraviolet (UV) light into electrically conductive traces on a low temperature substrate. The presence of the additives further enhances the ability of the ink traces to be treated (dried or cured) and sintered properly during the rapid UV sintering process, thereby resulting in uniform conductive traces produced in a way that avoids thermal damage to the substrate. It is to be understood that inks can be applied and processed according to the present disclosure using broad band UV light to treat and/or sinter deposited inks as required by a given process for manufacturing electronic parts.

The ink is preferably a molecular ink. A molecular ink has a metal cation, such as Ag or Cu that is reducible to the 0 oxidation state on sintering. In contrast, a nanoparticle ink (flakes or other shapes) has metal particles that are already in the 0 oxidation state, which simply fuse on curing. In one embodiment the molecular ink is a silver oxalate based ink.

The thermal protecting agent preferably comprises a conjugated polymer, a polyether, a fatty acid or any mixture thereof. Conjugated polymers are preferably poly(fluorenes), poly(thiophenes) or the like or any mixture thereof. Specific examples of conjugated polymers include, for example, polymers of the formula (I) and formula (II):

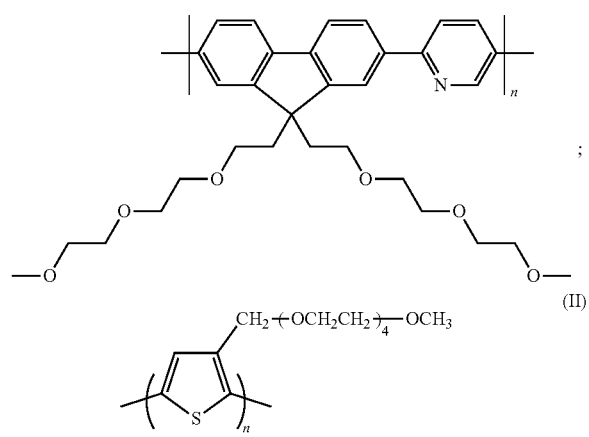

where n is an integer from 5 to 2000, preferably 10-100. The polyether is preferably a polyethylene glycol, or polyoxetane. The polyethylene glycol preferably has a molecular weight in a range of 500-100,000 Da. Fatty acids may be saturated or unsaturated and may include short-chain fatty acids ($C_{1-5}$), medium-chain fatty acids ($C_{6-12}$), long-chain fatty acids ($C_{13-21}$), very long chain fatty acids ($C_{22}$ or more) or any mixture thereof. $C_{2-16}$ fatty acids are preferred. Medium-chain fatty acids ($C_{6-12}$) are particularly preferred.

Examples of medium-chain fatty acids include hexanoic acid, heptanoic acid, octanoic acid, nonanoic acid, decanoic acid, neodecanoic acid (a mixture of decanoic acid isomers), undecylenic acid, or any mixture thereof. The thermal protecting agent may be present in the ink in an amount of about 0.01 wt % to about 5 wt %, based on total weight of the ink. Preferably, the amount of thermal protecting agent is about 0.1 wt % or more. Preferably, the amount of thermal protecting agent is about 3 wt % or less. In one embodiment, a silver oxalate-based ink is combined with hexanoic acid as a thermal protecting agent.

In one embodiment, the thermal protecting agent is a polymer present in the ink in an amount of about 0.01 wt % to about 1 wt % based on the total weight of the ink. In another embodiment, the thermal protecting agent is a fatty acid present in the ink in an amount of about 0.5 wt % to about 5 wt % based on the total weight of the ink.

The silver or copper carboxylates in the ink are preferably organic silver or copper salts, respectively, comprising a silver or copper ion and an organic group containing a carboxylic acid moiety. The carboxylate preferably comprises from 1 to 20 carbon atoms, more preferably from 1 to 12 carbon atoms, still more preferably from 1 to 10 carbon atoms, and yet still more preferably from 1 to 6 carbon atoms. The carboxylate is preferably a $C_{1-20}$ alkanoate, more preferably a $C_{1-12}$ alkanoate, still more preferably a $C_{1-10}$ alkanoate, and yet still more preferably a $C_{1-6}$ alkanoate. The silver or copper carboxylate is preferably a silver or copper salt of a $C_{1-20}$ alkanoic acid, more preferably $C_{1-12}$ alkanoic acid, still more preferably a $C_{1-10}$ alkanoic acid and yet still more preferably a $C_{1-6}$ alkanoic acid.

The silver or copper carboxylate preferably has a thermal decomposition temperature of 160° C. or less, more preferably 150° C. or less, yet more preferably 130° C. or less.

Suitable silver carboxylate based inks are disclosed in WO 2018/146616. Silver carboxylates are preferably organic silver salts comprising a silver ion and an organic group containing a carboxylic acid moiety. The carboxylate preferably comprises from 1 to 20 carbon atoms. The carboxylate is preferably a $C_{1-20}$ alkanoate. The silver carboxylate is preferably a silver salt of a $C_{1-20}$ alkanoic acid. Some non-limiting examples of silver carboxylates are silver formate, silver acetate, silver oxalate, silver pivalate, silver propionate, silver butanoate, silver ethylhexanoate, silver pentafluoropropionate, silver citrate, silver glycolate, silver lactate, silver benzoate, silver benzoate derivatives, silver trifluoroacetate, silver phenylacetate, silver phenylacetate derivatives, silver hexafluoroacetyl-acetonate, silver isobutyrylacetate, silver benzoylacetate, silver propionylacetate, silver acetoacetate, silver alpha-methylacetoacetate, silver alpha-ethylacetoacetate, silver neodecanoate and any mixtures thereof. Silver oxalate, silver acetate and silver pivalate are particularly preferred. One or more than one silver carboxylate may be in the ink. The silver carboxylate is preferably dispersed in the ink. Preferably, the ink does not contain flakes of silver-containing material.

Suitable copper carboxylate based inks are provided at Example 7.

The silver or copper carboxylate may be present in the ink in any suitable amount, preferably in a range of about 5 wt % to about 75 wt %, based on total weight of the ink. More preferably, the amount is in a range of about 5 wt % to about 60 wt %, or about 5 wt % to about 50 wt %, or about 10 wt % to about 75 wt %, or about 10 wt % to about 60 wt %, or about 10 wt % to about 45 wt %, or about 25 wt % to about 40 wt %. In one especially preferred embodiment, the amount is in a range of about 30 wt % to about 35 wt %. In terms of silver or copper content, silver itself is preferably present in a range of about 3 wt % to about 30 wt % based on total weight of the ink. More preferably, the amount is in a range of about 6 wt % to about 30 wt %, or about 15 wt % to about 25 wt %. In one especially preferred embodiment, the amount is in a range of about 18 wt % to about 24 wt %.

Organic amine compounds may be aliphatic and/or aromatic amines, for example $C_{1-20}$ alkyl amines and/or $C_{6-20}$ aryl amines. The organic amine compound may be substituted with one or more other functional groups, preferably polar functional groups. Some non-limiting examples of other functional groups include —OH, —SH, =O, —CHO, —COOH and halogen (e.g. F, Cl, Br). Preferably, the other functional group is —OH. A particularly preferred class of organic amine compounds is the amino alcohols, especially hydroxyalkylamines. Hydroxyalkylamines preferably comprise from 2 to 8 carbon atoms. Some non-limiting examples of hydroxyalkylamines are 1,2-ethanolamine, 1-amino-2-propanol, 1,3-propanolamine, 1,4-butanolamine, 2-(butylamino)ethanol, 2-amino-1-butanol, and the like. 1-amino-2-isopropanol, 2-amino-1-butanol or mixtures thereof are particularly preferred. One or more than one organic amine compound may be in the ink.

The organic amine may be present in the ink in any suitable amount, preferably in a range of about 10 wt % to about 75 wt %, based on total weight of the ink. More preferably, the amount is in a range of about 20 wt % to about 60 wt %, or about 25 wt % to about 55 wt %. In one especially preferred embodiment for use with silver carboxylates, the amount is in a range of about 40 wt % to about 50 wt %.

The silver or copper carboxylate and organic amine compound may form a complex in the ink. The complex may comprise a molar ratio of silver carboxylate to organic amine compound of 1:1 to 1:4, for example 1:1 or 1:2 or 1:3 or 1:4. Complexes of the silver or copper carboxylate and organic amine may provide silver or copper metal precursors that may be formulated with other components as the ink.

The ink may also comprise an organic binder. The organic polymer binder may be any suitable polymer, preferably a thermoplastic or elastomeric polymer. The organic polymer binder is preferably compatible with the organic amine compound, whereby a mixture of the organic amine compound in the organic polymer binder does not lead to significant phase separation. Some non-limiting examples are cellulosic polymers, polyacrylates, polystyrenes, polyolefins, polyvinyl acetals, polyesters, polyimides, polyols, polyurethanes and mixtures thereof. The organic polymer binder may be homopolymeric or copolymeric. Cellulosic polymers are particularly preferred, for example, methylcellulose, ethylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, carboxymethyl cellulose or a mixture thereof. Hydroxyethyl cellulose is particularly preferred.

The organic polymer binder may be present in the ink in any suitable amount, preferably in a range of about 0.05 wt % to about 10 wt %, based on total weight of the ink. More preferably, the amount is in a range of about 0.1 wt % to about 5 wt %, or about 0.2 wt % to about 2 wt %, or about 0.2 wt % to about 1 wt %. In one especially preferred embodiment, the amount is in a range of about 0.3 wt % to about 0.95 wt %.

The ink may also comprise a surface tension modifier. The surface tension modifier may be any suitable additive that improves flow and leveling properties of the ink. Some non-limiting examples are surfactants (e.g. cationic or anionic surfactants), alcohols (e.g. propanol), glycolic acid, lactic acid and mixtures thereof. Lactic acid is particularly preferred. Without the surface tension modifier, shape retention of traces produced from the ink may be poor, particularly in humid environments, resulting in nonuniform features.

The surface tension modifier may be present in the ink in any suitable amount, preferably in a range of about 0.1 wt % to about 5 wt %, based on total weight of the ink. More preferably, the amount is in a range of about 0.5 wt % to about 4 wt %, or about 0.8 wt % to about 3 wt %. In one especially preferred embodiment, the amount is in a range of about 1 wt % to about 2.7 wt %. In another especially preferred embodiment, the amount is in the range of 0.8 wt % to about 1.5 wt %.

The ink may also comprise a solvent. The solvent may be an aqueous or an organic solvent. Organic solvents or mixtures of organic solvents are preferred. In some instances, a mixture of one or more organic solvents with an aqueous solvent may be utilized. The solvent is preferably compatible with one or both of the organic amine compound or organic polymer binder. The solvent is preferably compatible with both the organic amine compound and the organic polymer binder. The organic amine compound and/or organic polymer binder are preferably dispersible, for example soluble, in the solvent. The organic solvent may be aromatic, non-aromatic or a mixture of aromatic and non-aromatic solvents. Aromatic solvents include, for example, benzene, toluene, ethylbenzene, xylenes, chlorobenzene, benzyl ether, anisole, benzonitrile, pyridine, diethylbenzene, propylbenzene, cumene, isobutylbenzene, p-cymene, tetralin, trimethylbenzenes (e.g. mesitylene), durene, p-cumene or any mixture thereof. Non-aromatic solvents include, for example, terpenes, glycol ethers (e.g. dipropylene glycol methyl ether, methylcarbitol, ethylcarbitol, butylcarbitol, triethyleneglycol and derivatives thereof), alcohols (e.g. methylcyclohexanols, octanols, heptanols) or any mixture thereof. Dipropylene glycol methyl ether is preferred.

When present, the solvent is preferably present in the ink in any suitable amount, preferably in a range of about 1 wt % to about 50 wt %, based on total weight of the ink. More preferably, the amount is in a range of about 2 wt % to about 35 wt %, or about 5 wt % to about 25 wt %. In one especially preferred embodiment, the amount is in a range of about 10 wt % to about 20 wt %. In another especially preferred embodiment, the amount is in the range of about 5 wt % to about 10 wt %. The solvent generally makes up the balance of the ink.

The ink may also comprise a defoaming agent. The defoaming agent may be any suitable anti-foaming additive. Some non-limiting examples are fluorosilicones, mineral oils, vegetable oils, polysiloxanes, ester waxes, fatty alcohols, glycerol, stearates, silicones, polypropylene based polyethers and mixtures thereof. Glycerol and polypropylene based polyethers are particularly preferred. In the absence of the defoaming agent, some printed traces may tend to retain air bubbles following printing, resulting in nonuniform traces.

The defoaming agent may be present in the ink in any suitable amount, preferably in a range of about 0.0001 wt % to about 1 wt %, based on total weight of the ink. More preferably, the amount is in a range of about 0.001 wt % to about 0.1 wt %, or about 0.002 wt % to about 0.05 wt %. In one especially preferred embodiment, the amount is in a range of about 0.005 wt % to about 0.01 wt %.

The ink may also comprise a thixotropy modifying agent. The thixotropy modifying agent may be any suitable thixotropy-modifying additive. Some non-limiting examples are polyhydroxycarboxylic acid amides, polyurethanes, acrylic polymers, latex, polyvinylalcohol, styrene/butadiene, clay, clay derivatives, sulfonates, guar, xanthan, cellulose, locust gum, acacia gum, saccharides, saccharide derivatives, casein, collagen, modified castor oils, organosilicones and mixtures thereof.

The thixotropy modifying agent may be present in the ink in any suitable amount, preferably in a range of about 0.05 wt % to about 1 wt %, based on total weight of the ink. More preferably, the amount is in a range of about 0.1 wt % to about 0.8 wt %. In one especially preferred embodiment, the amount is in a range of about 0.2 wt % to about 0.5 wt %.

The ink may be deposited on a substrate by any suitable method to form a non-conductive trace of the ink on the substrate. The ink is particularly suited for printing, for example, roll-to-roll printing, screen printing, inkjet printing, flexography printing, gravure printing, off-set printing, airbrushing, aerosol jet printing, typesetting, stamp or any other method. High throughput, high speed printing such as roll-to-roll printing is especially preferred.

After deposition on the substrate, drying and decomposing the silver or copper carboxylate within the non-conductive trace forms a conductive trace. Drying and decomposition may be accomplished by any suitable technique; however, the ink is particularly suited for UV treatment (drying or curing) and sintering with broad spectrum UV light. Broad spectrum UV light has emissions in a range of about 300-800 nm. Broad spectrum UV light is similar to light produced from a standard metal halide bulb, mercury bulb or visible bulb, where broad emission between 300-800 nm are present. Because dense electrically conductive silver or copper traces may be formed quickly on a substrate from a silver or copper carboxylate with a suitably low decomposition temperature using standard broad-spectrum UV curing equipment, there is no need for thermal sintering or intense pulsed light sintering techniques to produce conductive traces. Suitable UV treatment (curing) and sintering systems that provide broad-spectrum UV light include, for example, a flood lamp-based system (e.g. DYMAX™ 5000-EC Series UV Curing Flood Lamp) and a UV curing machine (e.g. VITRAN™ II UV Screen Printing Conveyor Dryer or an American UV C12/300/2 12″ conveyor) fitted with an iron-doped and/or gallium-doped metal lamps, as provided for by the selected system. The UV sintering system may feature low intensity lamps that deliver a broadband spectrum of light. It is a particular advantage of the present inks that the lamp may deliver less energy to the traces than IPL sintering while producing electrically conductive sintered traces. For example, the Dymax™ lamp output is about 225 mW/cm$^2$, which can deliver 1.1 to 134.4 J/cm$^2$ to the traces over 5-600 seconds, respectively, to sinter the traces. More preferably, the lamp can deliver 1.1 to 67.2 J/cm$^2$ over 5-300 seconds, respectively. Or even more preferably, the lamp can deliver 1.1 to 13.4 J/cm$^2$ over 5-60, respectively. UV sintering may be performed under ambient conditions (e.g. in air).

In another aspect, broad spectrum UV light may be used to treat (dry or cure) and sinter molecular inks with or without the presence of the thermal protecting agent in the ink. Molecular inks with or without a thermal protecting agent, which otherwise have the same composition as described above, self-limit a temperature increase in the ink during sintering so that an ink temperature is reached that is high enough to decompose the ink, but that the temperature increase is localized mainly to the area of the substrate that is occupied by the ink. Thus, the molecular ink formulation self-limits heating observed during UV sintering, thereby localizing the heat to the area on the substrate occupied by the ink. The heat localized in the ink drives conversion of the metal salt into conductive metal (e.g. silver) nanoparticles without unduly heating the substrate thereby reducing or eliminating damage to the substrate. It is not possible to expose the ink to such temperatures thermally without damaging the substrate unless sintering times are also adjusted. In one embodiment, the silver carboxylate molecular ink is heated to a temperature range of about 130 to about 160° C. for 1-6 minutes.

It is possible in some cases not to use the thermal protecting agent and still obtain conductive traces post UV sintering. In one embodiment a copper carboxylate and amino diol ink (without a thermal protecting agent) can provide conductive copper traces using UV sintering times of 5-10 minutes or 8-10 minutes. In other cases not using the thermal protecting agent may require adjusting the UV sintering process to still obtain conductive traces. However, the use of the thermal protecting agent improves the quality of traces and provides the option to have good quality conductive traces even under more intense irradiation conditions, such that the production of uncracked, conductive traces with a variety of dimensions (narrow, 200-500 um as well as 1-2 cm traces) are possible. This has beneficial impacts on the sintering process in that depending on the deposition process, shorter or longer periods of time may be needed to reach equivalent electrical performance properties. Therefore, depending on the dose of broad spectrum UV to be delivered, shorter or longer sintering times can be used. Where the deposition processes requires short, more intense energy sintering times to be economical (e.g. roll-to-roll printing), the inclusion of the thermal protecting agent is useful.

The substrate may be any suitable surface, especially printable surface. Printable surfaces may include, for example PET (e.g. Melinex™), amorphous polyethylene terephthalate (APET), glycol modified polyethylene terephthalate (PET-G), polyethylene naphthalate (PEN), polyolefin (e.g. silica-filled polyolefin (Teslin™)), polydimethylsiloxane (PDMS), polystyrene, polycarbonate, polyimide (e.g. Kapton™), thermoplastic polyurethane (TPU), acrylonitrile/butadiene/styrene, polystyrene, silicone membranes, wool, silk, cotton, flax, jute, modal, bamboo, nylon, polyester, acrylic, aramid, spandex, polylactide, textiles (e.g. cellulosic textiles), paper, glass, metal, dielectric coatings, among others.

While the ink may be deposited and sintered on any suitable substrate useful for manufacturing electronic devices, the ink is particularly useful in conjunction with low temperature substrates. Low temperature substrates are substrates that suffer damage (e.g. warping, bending, thermally degrading or the like) at a substrate temperature of 150° C., or 160° C. or higher, over a period of 10 minutes or less. Some examples of low temperature substrates include PET (e.g. Melinex™), amorphous polyethylene terephthalate (APET), polyethylene naphthalate (PEN), polycarbonate (PC), thermoplastic polyurethane (TPU), textiles, cotton, nylon, polyester and elastomeric blends.

Preferred low temperature substrates are shapeable substrates. Shapeable substrates may be flexible (e.g. bendable, stretchable, twistable etc.) under particular forming conditions. In some instances, the shapeable substrate may retain the shaped form after forming, while in other instances, external force may be required to retain the shaped substrate in the shaped form. The shapeable substrate may be formed into the shaped substrate in any suitable manner, for example thermoforming, cold forming, extrusion, blow molding, etc.

In some embodiments, the ink may be used in a photopatterning method to create conductive traces on a substrate. In the photopatterning method, the ink may be deposited on a substrate and a mask applied over top of the deposited ink. The mask has a pattern of apertures thereon through which broad spectrum UV light may be applied to the ink thereunder. The portions of the deposited ink, which are covered by the mask will not be exposed to UV light during sintering and will therefore not sinter into conductive traces. The unexposed ink can be washed off the substrate after sintering to leave a pattern of conductive traces corresponding to the pattern of apertures in the mask.

The conductive trace on the substrate may be incorporated into an electronic device, for example electrical circuits, conductive bus bars (e.g. for photovoltaic cells), sensors (e.g. touch sensors, wearable sensors), antennae (e.g. RFID antennae), thin film transistors, diodes, smart packaging (e.g. smart drug packaging), conformable inserts in equipment and/or vehicles, and multilayer circuits and MIM devices including low pass filters, frequency selective surfaces, transistors and antennas. The ink enables miniaturization of such electronic devices.

EXAMPLES

Example 1: Molecular Ink Formulation (Silver and Copper Carboxylate Based)

Molecular inks were formulated in accordance with the compositions shown in Tables 1-8. The inks are preferably used shortly after formulation but may be stored for longer periods of time at a temperature in a range of about −4° C. to about 4° C. without significant decomposition. In addition, the inks can be recovered and reused for further printing provided they are stored in the above-mentioned temperature range.

TABLE 1

A low temperature silver ink (C1) without thermal protecting agent

| Component | Purpose of addition | Mass (g) | % by weight |
|---|---|---|---|
| Silver oxalate | Silver precursor | 7.935 | 35.00 |
| 1-Amino-2-isopropanol/ 2-Amino-1-butanol (2.67/1) | Amine | 12.2455 | 54.01 |
| Lactic acid | Surface tension modifier | 0.2046 | 0.90 |
| Hydroxyethyl cellulose (HOEC) | Binder | 0.1647 | 0.73 |
| Dipropylene glycol monomethyl ether (DPGME) | Solvent | 2.0521 | 9.05 |
| Antifoam 204 | Defoaming agent | 0.0017 | 0.00749 |
| BYK R605 (a polyhydroxycarboxylic acid amide) | Thixotropy agent | 0.0688 | 0.30 |

TABLE 2

A low temperature silver ink (I1) containing silver oxalate and a conjugated polymer-based thermal protecting agent

| Component | Purpose of addition | Mass (g) | % by weight |
|---|---|---|---|
| Silver oxalate | Silver precursor | 6.78 | 34.24 |
| 1-Amino-2-isopropanol/2-Amino-1-butanol (2.67/1) | Amine | 10.4298 | 52.67 |
| Lactic acid | Surface tension modifier | 0.1656 | 0.84 |
| Hydroxyethyl cellulose (HOEC) | Binder | 0.1403 | 0.71 |
| Dipropylene glycol monomethyl ether (DPGME) | Solvent | 1.3615 | 6.88 |
| Iso-propanol | Solvent | 0.7897 | 3.99 |
| Antifoam 204 | Defoaming agent | 0.0015 | 0.00752 |
| BYK R605 (a polyhydroxycarboxylic acid amide) | Thixotropy agent | 0.0543 | 0.27 |
| Polymer of Formula (I) (MW~25000 Da) | Thermal protecting agent | 0.0791 | 0.40 |

TABLE 3

A low temperature silver ink (I2) containing silver oxalate and a conjugated polymer-based thermal protecting agent

| Component | Purpose of addition | Mass (g) | % by weight |
|---|---|---|---|
| Silver oxalate | Silver precursor | 3.1976 | 34.16 |
| 1-Amino-2-isopropanol/2-Amino-1-butanol (2.67/1) | Amine | 4.9415 | 52.78 |
| Lactic acid | Surface tension modifier | 0.080 | 0.85 |
| Hydroxyethyl cellulose (HOEC) | Binder | 0.0655 | 0.71 |
| Dipropylene glycol monomethyl ether (DPGME) | Solvent | 0.6443 | 6.88 |
| Iso-propanol | Solvent | 0.3700 | 3.95 |
| Antifoam 204 | Defoaming agent | 0.0007 | 0.00756 |
| BYK R605 (a polyhydroxycarboxylic acid amide) | Thixotropy agent | 0.0310 | 0.33 |
| Polymer of Formula (II) (MW~18000 Da) | Thermal protecting agent | 0.0301 | 0.32 |

TABLE 4

A low temperature silver ink (I3) containing silver oxalate and a carboxylic acid-based thermal protecting agent

| Component | Purpose of addition | Mass (g) | % by weight |
|---|---|---|---|
| Silver oxalate | Silver precursor | 15.71 | 34.66 |
| 1-Amino-2-isopropanol/2-Amino-1-butanol (2.67/1) | Amine | 24.2780 | 53.56 |
| Lactic acid | Surface tension modifier | 0.405 | 0.89 |
| Hydroxyethyl cellulose (HOEC) | Binder | 0.3265 | 0.72 |
| Dipropylene glycol monomethyl ether (DPGME) | Solvent | 4.0485 | 8.93 |

TABLE 4-continued

A low temperature silver ink (I3) containing silver oxalate and a carboxylic acid-based thermal protecting agent

| Component | Purpose of addition | Mass (g) | % by weight |
|---|---|---|---|
| Antifoam 204 | Defoaming agent | 0.0035 | 0.00772 |
| BYK R605 (a polyhydroxycarboxylic acid amide) | Thixotropy agent | 0.165 | 0.36 |
| Hexanoic acid | Thermal protecting agent | 0.391 | 0.86 |

TABLE 5

A low temperature silver ink (I4) containing silver oxalate and a carboxylic acid-based thermal protecting agent

| Component | Purpose of addition | Mass (g) | % by weight |
|---|---|---|---|
| Silver oxalate | Silver precursor | 4.6042 | 34.68 |
| 1-Amino-2-isopropanol/2-Amino-1-butanol (2.67/1) | Amine | 7.1199 | 53.64 |
| Lactic acid | Surface tension modifier | 0.0.1157 | 0.87 |
| Hydroxyethyl cellulose (HOEC) | Binder | 0.0958 | 0.72 |
| Dipropylene glycol monomethyl ether (DPGME) | Solvent | 1.1770 | 8.87 |
| Antifoam 204 | Defoaming agent | 0.0010 | 0.00768 |
| BYK R605 (a polyhydroxycarboxylic acid amide) | Thixotropy agent | 0.0384 | 0.29 |
| Neodecanoic acid | Thermal protecting agent | 0.1225 | 0.92 |

TABLE 6

A low temperature silver ink (I5) containing silver oxalate and a polyether-based thermal protecting agent

| Component | Purpose of addition | Mass (g) | % by weight |
|---|---|---|---|
| Silver oxalate | Silver precursor | 4.2683 | 33.76 |
| 1-Amino-2-isopropanol/2-Amino-1-butanol (2.67/1) | Amine | 6.6006 | 52.20 |
| Lactic acid | Surface tension modifier | 0.1073 | 0.85 |
| Hydroxyethyl cellulose (HOEC) | Binder | 0.0888 | 0.70 |
| Dipropylene glycol monomethyl ether (DPGME) | Solvent | 1.0908 | 8.63 |
| Ethanol | Solvent | 0.3874 | 3.06 |
| Antifoam 204 | Defoaming agent | 0.0009 | 0.00746 |
| BYK R605 (a polyhydroxycarboxylic acid amide) | Thixotropy agent | 0.0356 | 0.28 |
| Polyethylene glycol (PEG2K) | Thermal protecting agent | 0.0641 | 0.51 |

TABLE 7

A silver ink (I6) containing silver pivalate and a carboxylic acid-based thermal protecting agent

| Component | Purpose of addition | Mass (g) | % by weight |
|---|---|---|---|
| Silver pivalate | Silver precursor | 0.605 | 41.1 |
| 2-Amino-1-butanol | Amine | 0.8156 | 55.4 |
| Lactic acid | Surface tension modifier | 0.0179 | 1.2 |
| BYK R-605 | Thixotropy agent | 0.0104 | 0.7 |
| Hexanoic acid | Thermal protecting agent | 0.0224 | 1.5 |

TABLE 8

A silver ink (I7) containing silver acetate and a carboxylic acid-based thermalp rotecting agent

| Component | Purpose of addition | Mass (g) | % by weight |
|---|---|---|---|
| Silver acetate | Silver precursor | 0.723 | 35.8 |
| 2-Amino-1-butanol | Amine | 1.231 | 61.0 |
| Lactic acid | Surface tension modifier | 0.0306 | 1.5 |
| BYK R-605 | Thixotropy agent | 0.0104 | 0.5 |
| Heptanoic acid | Thermal protecting agent | 0.0246 | 1.2 |

Figure 1B:
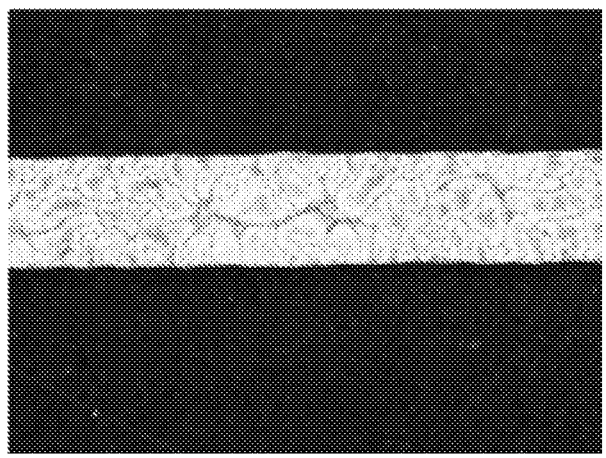
FIG. 1B depicts a trace on PET substrate produced from ink (I1) having a conjugated polymer as a thermal protecting agent following UV sintering using a DYMAX™ 5000-EC Series UV Curing Flood Lamp system at a distance of 10 cm from the bulb for 4.5 minutes.
Figure 2A:
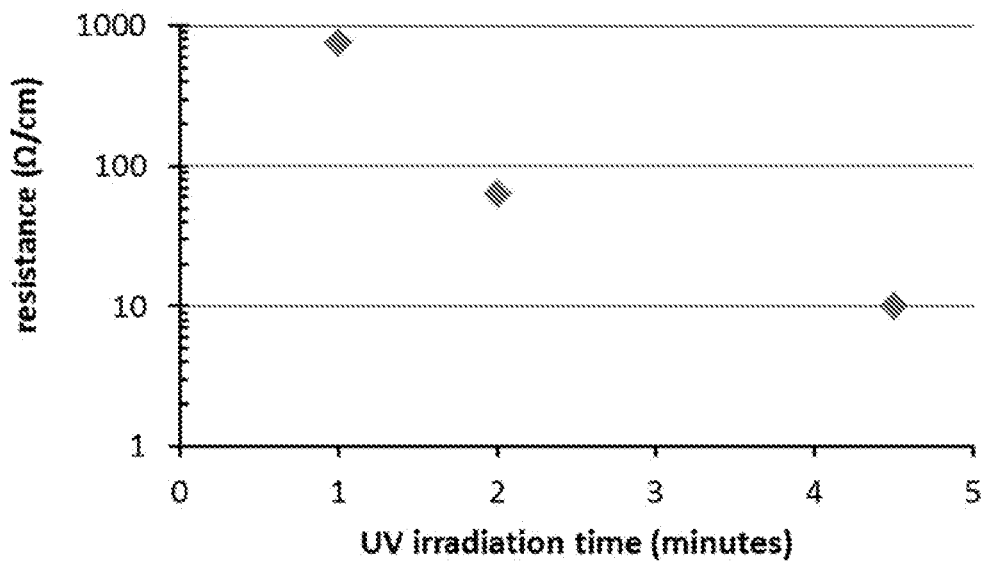
FIG. 2A depicts a graph of resistance (Ω/cm) vs. UV irradiation time (minutes) for linear 4 cm long traces produced from the molecular ink I1 on a PET substrate using a DYMAX™ 5000-EC Series UV Curing Flood Lamp system at a distance of 10 cm from the bulb for 5 minutes showing how the resistance measured across the traces changes as the duration of UV light exposure increases.
Figures 2B, 2C:
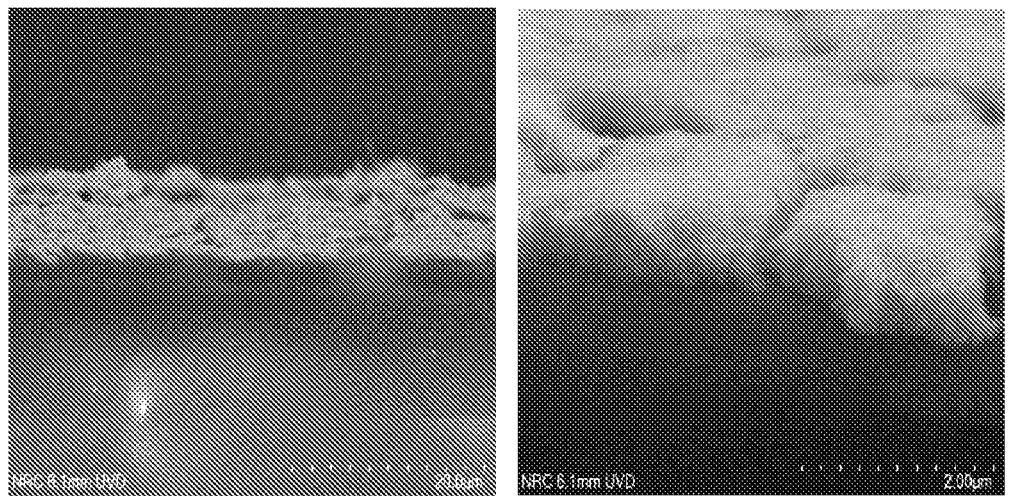
FIG. 2B and FIG. 2C depict a scanning electron micrograph (SEM) cross-sectional analysis of the UV sintered trace of FIG. 2A showing that the trace has a dense and nonporous metal structure throughout the trace.

Example 2: Sintered Silver Traces Produced from Molecular Inks Containing Conjugated Polymers as Thermal Protecting Agents Sintered silver traces 4 cm long on Melinex™ (PET) substrate were produced from the molecular ink I1 (where the thermal protecting agent is the polymer of Formula (I)) by UV sintering using a DYMAX™ 5000-EC Series UV Curing Flood Lamp system at a distance of 10 cm from the bulb for 1 to 5 minutes. As seen in FIG. 2A, conductive silver traces can be produced on PET following as little as 1 minute of broad spectrum UV irradiation, but 4.5 minutes produces traces with better conductivity. As seen in FIG. 1A and FIG. 1B, the UV sintered silver trace produced on PET from I1 (FIG. 1B) is uncracked, while a silver trace of C1 (FIG. 1A) produced under the same conditions on PET is cracked and, as a result, nonconductive. Thus, without the thermal protecting agent, the silver traces on PET do not become conductive as reliably under analogous broad-spectrum UV sintering conditions (see also Table 9b). Further, as seen in FIG. 2B and FIG. 2C, SEM analysis suggests that surface morphology of the trace formed from I1 is rough, but there is a dense, uniform layer of nanoparticles produced following broad spectrum UV sintering. The morphology of the UV sintered traces of 11 is similar to morphologies obtainable by thermal sintering.

The dimensional and electrical properties of UV sintered silver traces produced from I1 are provided in Table 9a. The total light exposure is 68 J/cm$^2$ (light exposure of 300 seconds). It is evident from Table 9a, that the silver traces have good conductivity. UV sintering of the molecular ink I2 on PET under the same conditions produces silver traces without cracking and having similar conductivities as the traces produced from I1.

TABLE 9a

The dimensional and electrical properties of UV sintered (300 s under DYMAX light system) silver traces produced from I1

| Trace linewidth (mil) | Trace length (cm) | Resistance (Ω) | linewidth (μm) | mΩ/□ | Trace thickness (μm) | Sheet Resistivity (mΩ/□/mil) | Volume Resistivity (μΩ·cm) |
|---|---|---|---|---|---|---|---|
| 3 ± 0.7 | 4 | 44.5 ± 0.2 | 364 ± 18 | 405 ± 21 | 0.51 ± 0.25 | 8.1 ± 4.2 | 21 ± 11 |

Figure 3:
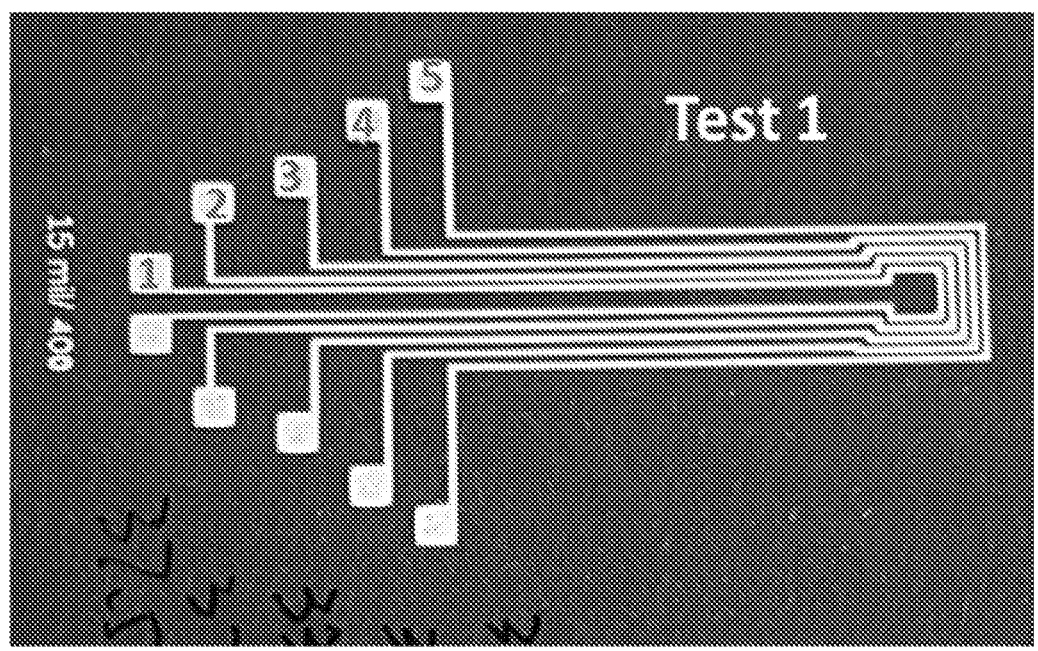
FIG. 3 depicts traces produced from ink (I3) having a fatty acid as a thermal protecting agent UV-sintered on a PET substrate using a DYMAX™ 5000-EC Series UV Curing Flood Lamp system at a distance of 10 cm from the bulb for 5 minutes.

Example 3: Sintered Silver Traces Produced from Molecular Inks Containing Fatty Acids as Thermal Protecting Agents Analogously to Example 2, addition of fatty acids as thermal protecting agents, for example hexanoic acid (I3) or neodecanoic acid (I4), also enables direct conversion of the molecular inks to conductive silver traces on a low temperature substrate (e.g. PET) using broad spectrum UV light. The resulting silver traces do not crack following UV-based sintering (see FIG. 3) and have electrical properties quite similar to those achieved through thermal processing.

The resistance measured across the five test traces produced from I3 screen printed on PET and UV sintered using a DYMAX 5000-EC Series UV Curing Flood Lamp system at a distance of 10 cm from the bulb for 5 minutes are shown in Table 10. The dimensional and electrical properties are shown in Table 11. The results for standard bend and crease tests (ASTM F1683-02) are shown in Table 12. The total light exposure is 68 J/cm². It is evident from Table 10, Table 11 and Table 12 that the sintered silver traces on PET substrate produced by sintering traces of I3 with broad spectrum UV light have good conductivity and are able to retain good conductivity without open circuit breaks under the standard bend and crease tests.

TABLE 10

The measured resistance of 5 sets of 11 cm long traces of UV sintered (300 s under DYMAX light system) I3 ink.

| line | test 1 Resistance (Ω) | test 2 Resistance (Ω) | test 3 Resistance (Ω) | test 4 Resistance (Ω) | test 5 Resistance (Ω) | Average Resistance (Ω) |
|---|---|---|---|---|---|---|
| 1 | 37.5 | 46.4 | 37 | 30 | 45 | 39 ± 6 |
| 2 | 37.5 | 42 | 37 | 29 | 56 | 40 ± 9 |
| 3 | 33.7 | 41 | 35 | 30 | 40 | 36 ± 4 |
| 4 | 33.3 | 42 | 37 | 31 | 42 | 37 ± 5 |
| 5 | 35.7 | 48 | 42 | 34 | 53 | 43 ± 7 |

TABLE 11

The dimensional and electrical properties of UV sintered (300 s under DYMAX light system) silver traces produced from I3

| Trace linewidth (μm) | Trace Length (cm) | # of □ | mΩ/□ | Trace thickness (μm) | Sheet Resistivity (mΩ/□/mil) | Volume Resistivity (μΩ·cm) |
|---|---|---|---|---|---|---|
| 401 | 11 | 274 | 143 | 1.10 ± 0.54 | 6.2 ± 1.1 | 15.7 ± 2.7 |
| 417 | 11 | 264 | 153 | 0.83 ± 0.01 | 5.0 ± 1.2 | 12.7 ± 3.1 |
| 417 | 11 | 264 | 136 | 0.83 ± 0.06 | 4.4 ± 0.6 | 11.3 ± 1.4 |
| 411 | 11 | 267 | 139 | 0.90 ± 0.02 | 4.9 ± 0.7 | 12.5 ± 1.7 |
| 417 | 11 | 264 | 161 | 0.98 ± 0.09 | 6.2 ± 1.2 | 15.8 ± 3.0 |

TABLE 12

The mechanical properties of UV sintered (300 s under DYMAX light system) silver traces produced from I3. The change in resistance values after the test are shown.

| Line (15 mil) | Original resistance (Ω) | Resistance after test, Ω (% change in resistance) | | | |
|---|---|---|---|---|---|
| | | Compressive flex | Tensile flex | Compressive crease | Tensile crease |
| 1 | 36.3 | 37.6 (3.6) | 39.1 (4.0) | 40.2 (2.8) | 44.4 (10.4) |
| 2 | 37 | 37.9 (2.4) | 39.1 (3.2) | 40.2 (2.8) | 44.1 (9.7) |
| 3 | 34.7 | 35.4 (2.0) | 36.4 (2.8) | 37.5 (2.9) | 41.6 (10.9) |
| 4 | 37.4 | 38.1 (1.9) | 39.1 (2.6) | 40.3 (3.1) | 44.1 (9.4) |
| 5 | 42 | 43.2 (2.9) | 44.5 (3.0) | 46.1 (3.6) | 51.8 (12.4) |

An analogous experiment using neodecanoic acid (ink I4) as the thermal protecting agent provides UV sintered silver traces on PET also of good conductivity as shown in Table 13. Conductivity results obtained by thermally sintering I4 are shown in Table 14. Comparing Table 13 to Table 14 shows that the UV sintering of I4 on a PET substrate provides sintered silver traces having conductivities as good as those produced from thermal sintering, but using significantly shorter times

TABLE 13

The dimensional and electrical properties of UV sintered (300 s under DYMAX light system) silver traces produced from I4

| Nominal linewidth (mil) | Resistance (Ω) | Trace Length (cm) | # of □ | mΩ/□ | Trace thickness (μm) | Sheet Resistance (mΩ/□/mil) | Volume Resistance (μΩ·cm) |
|---|---|---|---|---|---|---|---|
| 15 | 27 | 8.1 | 191 | 142 | 0.99 | 5.5 | 14.0 |
| 20 | 20 | 8.1 | 152 | 133 | 0.90 | 4.7 | 12.0 |
| 25 | 16 | 8.1 | 129 | 124 | 0.85 | 4.1 | 10.5 |

TABLE 14

The dimensional and electrical properties of thermally sintered
(20 minutes, 120° C.) silver traces produced from I4

| Nominal linewidth (mil) | Resistance (Ω) | Trace Length (cm) | # of □ | mΩ/□ | Trace thickness (μm) | Sheet Resistivity (mΩ/□/mil) | Volume Resistivity (μΩ · cm) |
|---|---|---|---|---|---|---|---|
| 15 | 29 | 8.1 | 185 | 157 | 0.75 | 4.5 | 11.7 |
| 20 | 26 | 8.1 | 145 | 178 | 0.83 | 5.7 | 14.7 |

Standard bend and crease tests (ASTM F1683-02) were generally good for I4 producing no open circuit breaks as shown in Table 15, although the change in conductivity in the tensile crease rest tended to be higher than generally desired.

TABLE 15

The mechanical properties of UV sintered (300 s under DYMAX light system) silver traces produced from I4.

| Line (15 mil) | Change in resistance, Ω(%) | | | |
|---|---|---|---|---|
| | Compressive flex | Tensile flex | Compressive crease | Tensile crease |
| 1 | 1.5 | 4.9 | 9.7 | 13.9 |
| 2 | 1.7 | 0.7 | 12.3 | 22.2 |
| 3 | 1.4 | 3.5 | 3.8 | 26.1 |
| 4 | 1.3 | 1.8 | 6.0 | 39.0 |
| 5 | 0.0 | 1.3 | 3.5 | 18.1 |

Example 4: Sintered Silver Traces Produced from Molecular Inks Containing Polyether as Thermal Protecting Agent Analogously to Example 2, addition of a polyether, for example polyethylene glycol having a molecular weight of 2000 (PEG2K), also enables direct conversion of the molecular inks to conductive silver traces on a low temperature substrate (e.g. PET) using broad spectrum UV light. The resulting silver traces do not crack following UV-based sintering (see FIG. 4) and have electrical properties quite similar to those achieved through thermal processing.

The electrical and dimensional properties measured for a test trace produced from I5 screen printed on PET and UV sintered using a DYMAX 5000-EC Series UV Curing Flood Lamp system at a distance of 10 cm from the bulb for 7 minutes are shown in Table 16. The results for standard bend and crease tests (ASTM F1683-02) are shown in Table 17. It is evident from Table 16 and Table 17 that the sintered silver traces on PET substrate produced by sintering traces of I5 with broad spectrum UV light have good conductivity and are able to retain good conductivity without open circuit breaks under the standard bend and crease tests.

Conductivity results obtained by thermally sintering I5 at 130° C. for 20 minutes are shown in Table 18 and Table 19. Comparing Table 16 and Table 17 to Table 18 and Table 19 shows that the UV sintering of I5 on a PET substrate provides sintered silver traces having conductivities as good or better than as those produced from thermal sintering.

TABLE 16

The dimensional and electrical properties of UV sintered (420 s under DYMAX light system) silver traces produced from I5.

| Nominal linewidth (mil) | Resistance (Ω) | Trace Length (cm) | # of □ | mΩ/□ | Trace thickness (μm) | Sheet Resistivity (mΩ/□/mil) | Volume Resistivity (μΩ · cm) |
|---|---|---|---|---|---|---|---|
| 15 | 63 ± 5 | 11.0 | 253 ± 2 | 248 ± 17 | 0.95 ± 0.07 | 9.3 ± 1.2 | 23.6 ± 3.1 |

TABLE 17

The mechanical properties of UV sintered (420 s under DYMAX light system) silver traces produced from I5

| Line (15 mil) | Change in resistance (%) | | | |
|---|---|---|---|---|
| | Compressive flex | Tensile flex | Compressive crease | Tensile crease |
| | 1.3 ± 0.4 | 4.1 ± 0.8 | 10.2 ± 3.1 | 26.8 ± 15.1 |

TABLE 18

The dimensional and electrical properties of thermally sintered (30 minutes, 130° C.) silver traces produced from I5

| Nominal linewidth (mil) | Resistance (Ω) | Trace Length (cm) | # of □ | mΩ/□ | Trace thickness (μm) | Sheet Resistivity (mΩ/□/mil) | Volume Resistivity (μΩ · cm) |
|---|---|---|---|---|---|---|---|
| 15 | 122 ± 15 | 11.0 | 252 ± 1 | 483 ± 55 | 1.08 ± 0.07 | 20.6 ± 1.2 | 52.2 ± 6.3 |

TABLE 19

The mechanical properties of thermally sintered (30 minutes, 130° C.) silver traces produced from I5

| Line (15 mil) | Change in resistance (%) | | | |
|---|---|---|---|---|
| | Compressive flex | Tensile flex | Compressive crease | Tensile crease |
| | 0.2 ± 0.1 | 2.4 ± 1.1 | 10.8 ± 0.1 | 55.3 ± 48.6 |

Figure 4:
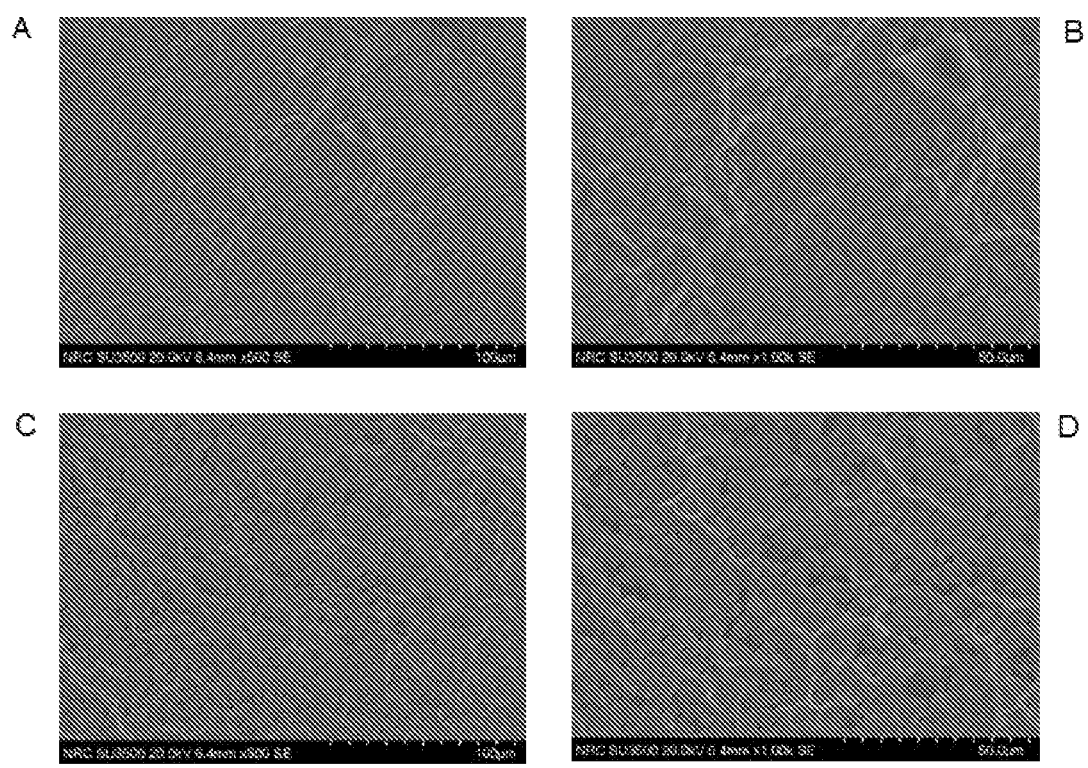
FIG. 4 depicts scanning electron micrographs of a UV sintered trace (A, B) and a thermally sintered trace (C, D) on PET produced from ink (I5) having polyethylene glycol (PEG2K) as a thermal protecting agent.

As seen in FIG. 4, the morphology of the UV sintered trace (A, B) is similar to that of the thermally sintered trace (C, D), both showing uniform traces of silver on the PET substrate. Panels A and C are at 500× magnification while panels B and D are at 1000× magnification.

Comparative Analysis

By way of summary and comparative analysis, Table 20 (with data collected from Tables 9-19) provides exemplary silver ink performance following UV sintering on Melinex ST605 (a PET substrate) according to the methods and processes disclosed herein, highlighting that without the addition of the thermal protecting agent conductive traces cannot be produced on this substrate. UV sintering was performed using a DYMAX 5000-EC Series UV Curing Flood Lamp system.

TABLE 20

| Ink | Thermal Protecting agent | UV light exposure tool | Cumulative Dose (mJ/cm²) | Time (s) | Cracks during UV sintering? | Resistivity (µΩ · cm) |
|---|---|---|---|---|---|---|
| C1 | None | DYMAX | 68.0 | 300 | yes | Not conductive |
| I1 | Polymer of formula (I) | DYMAX | 68.0 | 300 | no | 3 mil wide traces: 21 ± 11 |
| I3 | Hexanoic acid | DYMAX | 68.0 | 300 | no | 15 mil wide traces: 15.7 ± 3.1 |
| I4 | Neodecanoic acid | DYMAX | 68.0 | 300 | no | 15 mil wide traces: 14.0 20 mil wide traces: 12.0 25 mil wide traces: 10.5 |
| I5 | Polyethylene glycol (PEG2K) | DYMAX | 95.2 | 420 | no | 15 mil wide traces: 23.6 ± 3.1 |

Example 5: Photopatterning

Figure 5A:
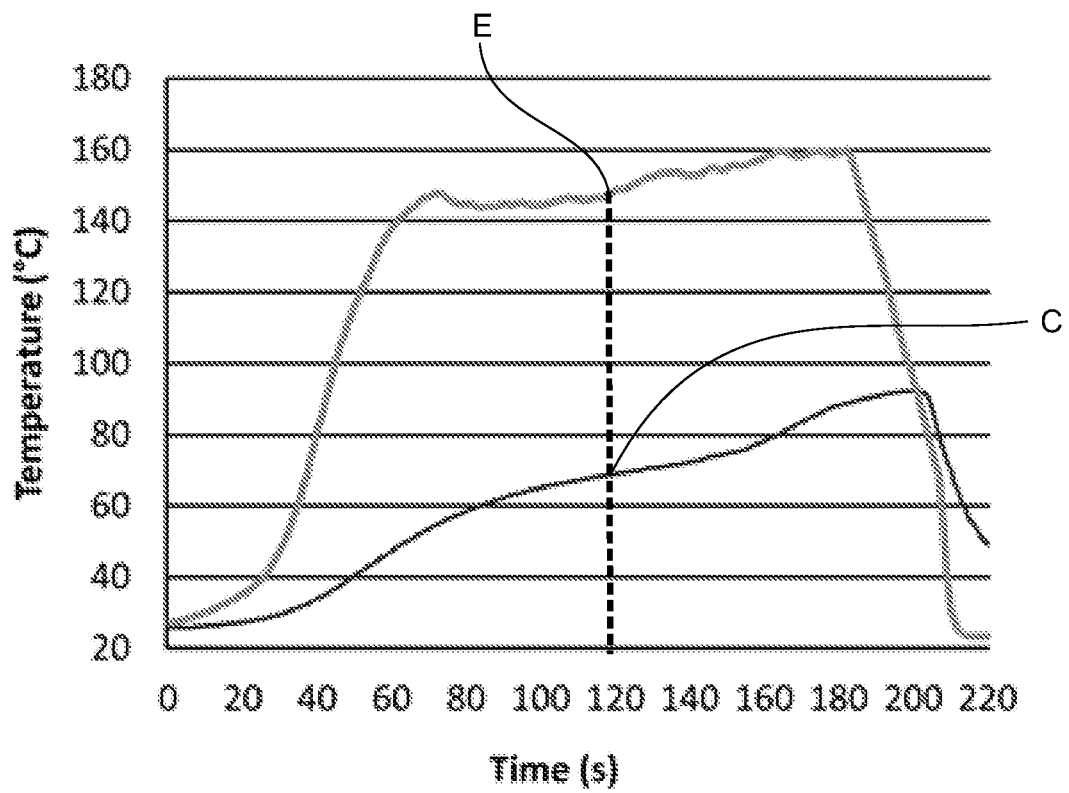
FIG. 5A is a graph of temperature (° C.) vs. time (s) for a sintering process using broad spectrum UV light to sinter a low temperature ink on PET.
Figure 5B:
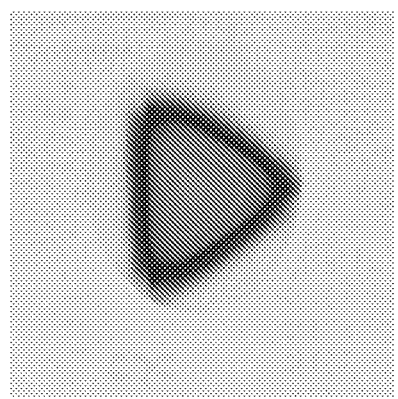
FIG. 5B illustrates a sintered trace on PET in a pattern formed from a triangular opening in a mask during the sintering process whose temperature profile is shown in FIG. 5A.
Figure 5C:
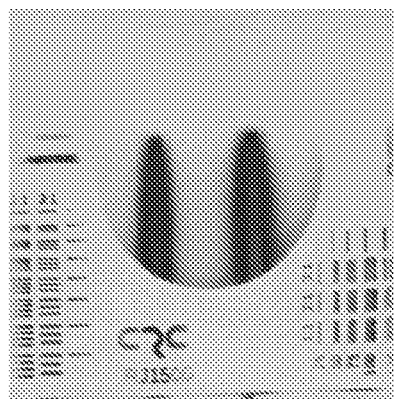
FIG. 5C illustrates a sintered trace in a pattern formed from slots in a mask during a sintering process on PET whose temperature profile is shown in FIG. 5A.

The molecular ink I3 was deposited as a 2 cm circular trace on a PET substrate. A triangular opening was cut out of a first card and the triangle cut out was centered over the 2 cm circular trace. Slots were cut out of a second card and the slots were centered over a second 2 cm circular trace. The covered traces were then exposed to a DYMAX 5000-EC Series UV Curing Flood Lamp system at a distance of 10 cm from the bulb for about 200 s. Over the duration of the exposure, the temperatures of the exposed part (E) and covered part (C) of the trace were measured, with the results shown in FIG. 5A. As seen in FIG. 5A, the temperature of the exposed parts (E) reached about 150° C. after 120 s, whereas the temperature of the covered parts (C) reached only about 70° C. after 120 s and reached no higher than about 90° C. during the sintering process. After exposure, the trace was washed with methanol, which readily removed the unreacted covered parts of the trace, while the exposed parts remained bound to the PET substrate. FIG. 5B illustrates the pattern formed from the triangular opening and FIG. 5C illustrates the pattern formed from the slots.

Example 6: Mechanistic Analysis

To study the mechanism by which broad spectrum UV light sinters molecular inks comprising silver precursors, several experiments were undertaken.

Thermal Analysis

Figure 6:
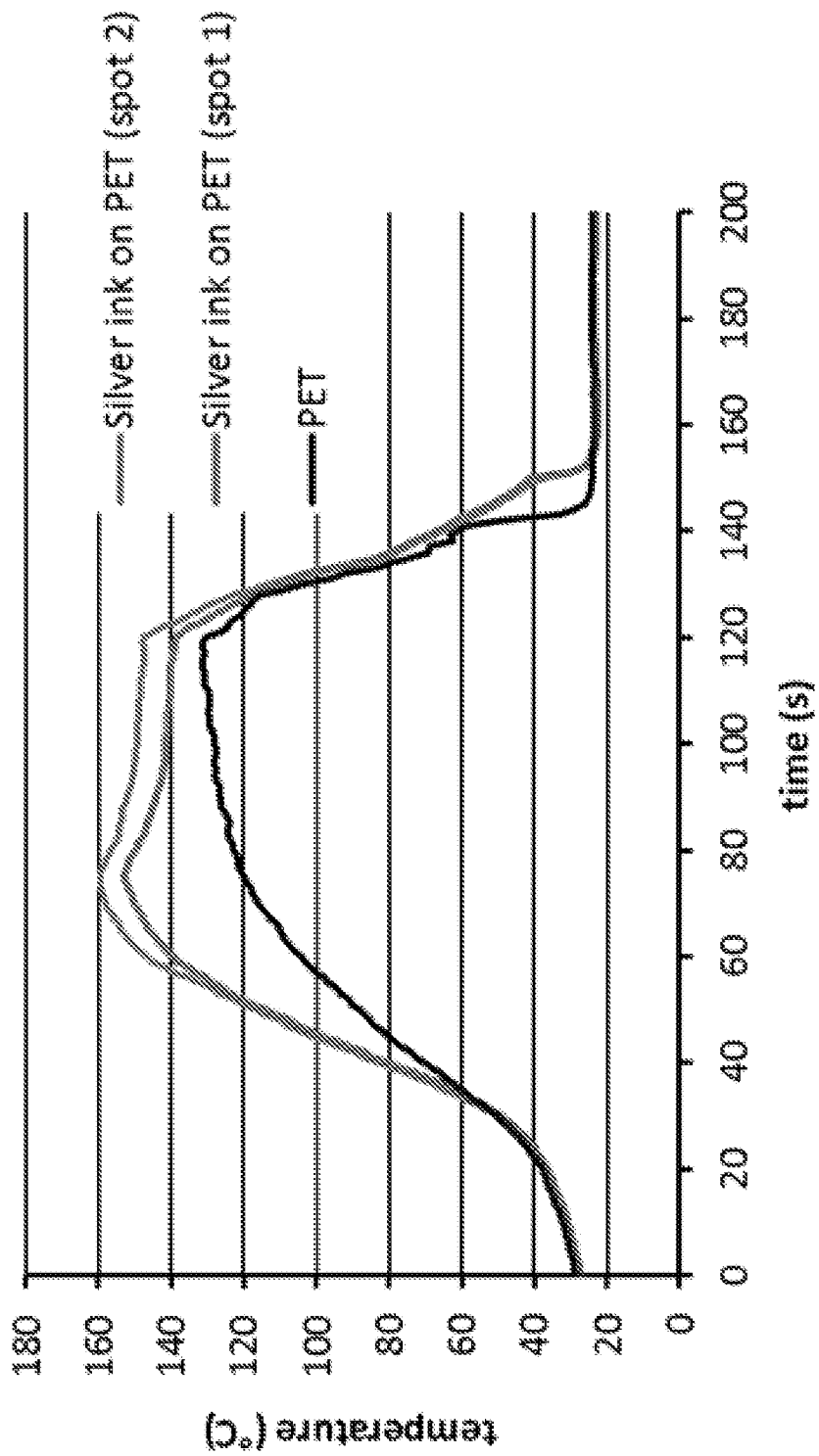
FIG. 6 depicts a graph of temperature (° C.) vs. time (s) during a sintering process using broad spectrum UV light to sinter a low temperature ink on a PET substrate.

In a thermal analysis of the sintering process using broad spectrum UV light (350-600 nm), thermocouples were attached to the bottom side of a PET substrate, where one thermocouple was placed directly under a 1 cm square trace produced from the ink I3 and the second was placed at a location of the ink traces. The sample was sintered using a DYMAX 5000-EC Series UV Curing Flood Lamp system at a distance of 10 cm from the bulb for 200 seconds. The lamp took 20-30 seconds to warm up and does not reach full brightness for at least 45 seconds. As can be seen in FIG. 6, at about 30 seconds, the temperature of the traces began to rise dramatically. At about 60 seconds, the temperature of the traces was between 130° C. and 140° C. At this temperature, the traces began to sinter and the formation of silver nanoparticles was observed. At 80 seconds, the temperature of the traces peaked and decreased by 10° C. By 90 seconds the conversion of silver precursor to conductive silver nanoparticles was essentially complete and there is little change in the electrical properties of the traces after this time. At 120 seconds, the silver nanoparticles were coalesced into uniform dense traces on the substrate. During the sintering process, the temperature of the traces was consistently about 10-30° C. higher than the temperature of the substrate at locations not under the traces, indicating that the silver molecular inks localize heat within the trace so that a sintering temperature in the trace can be achieved without unduly raising the temperature of the substrate. Further, the temperatures of the traces plateau and actually decrease as the traces turn to silver. This self-limited heating allows for the rapid UV curing of the traces, where it is possible to expose the traces to temperatures that can facilitate the decomposition of the silver salts in the inks and produce highly conductive traces in as little as 30-40 seconds for larger features (e.g. 1 cm2), which is fully compatible with roll to roll processing. Smaller features (200-500 um) can take up to 300 seconds.

UV-Visible Spectroscopic Analysis

Figure 7:
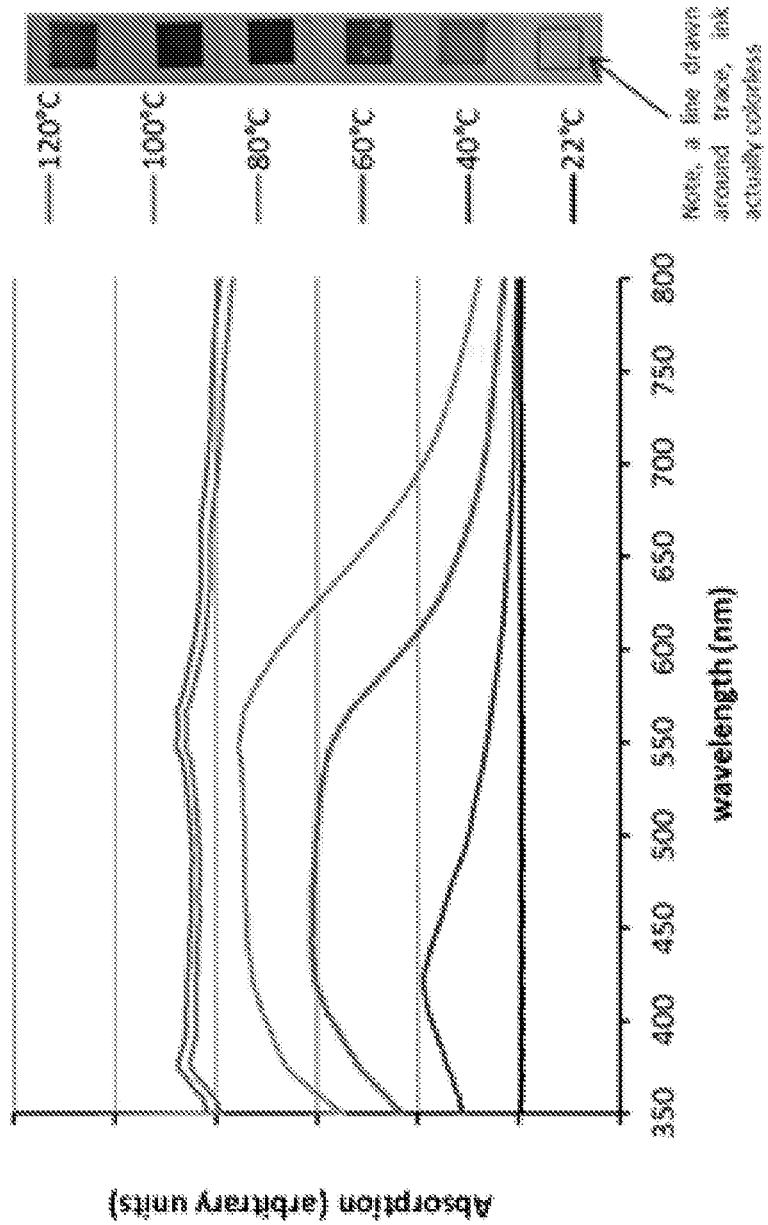
FIG. 7 depicts a graph of absorption vs. wavelength (nm) for ultraviolet-visible (UV-vis) spectroscopic analysis of a sintering process using broad spectrum UV light to sinter a low temperature ink on a PET substrate.

The production and aggregation of silver nanoparticles during the sintering of ink I3 with broad spectrum UV light, as described in the thermal analysis above, was monitored by measuring the changes in the UV-visible spectrum of a screen printed 1×1 cm square film. Specifically, UV-visible spectroscopy was also used to observe the point at which the ink traces become opaque. FIG. 7 shows absorbance across a 350-800 nm wavelength (λ) range for the traces at 22° C., 40° C., 60° C., 80° C., 100° C. and 120° C. As seen at the right side of FIG. 7, as the temperature of the traces increase from 22° C. to 120° C., the traces darken. As seen in FIG. 7, at 22° C., the ink does not absorb much light in the wavelength range between 350 nm and 800 nm. The trace at 22° C. is delineated by a drawn line because the trace is not dark enough to be visible at that temperature. As the temperature increases to 40-80° C., the formation of nanoparticles is evidenced by increased absorption at 420 nm and the aggregation of nanoparticles by increased absorption at 420-600 nm. As the temperature reached 100° C., the ink darkened to the point of opacity with complete absorption from 350-800 nm. There is substantially little additional absorption seen at 120° C.

Taken together, the thermal and spectroscopic analyses show that the molecular ink I3 acts as a UV absorber that self-limits the heat generated within the trace through the conversion of the silver precursor to silver metal.

Comparing Molecular Silver Inks to Silver Nanoparticle Ink

Figure 8:
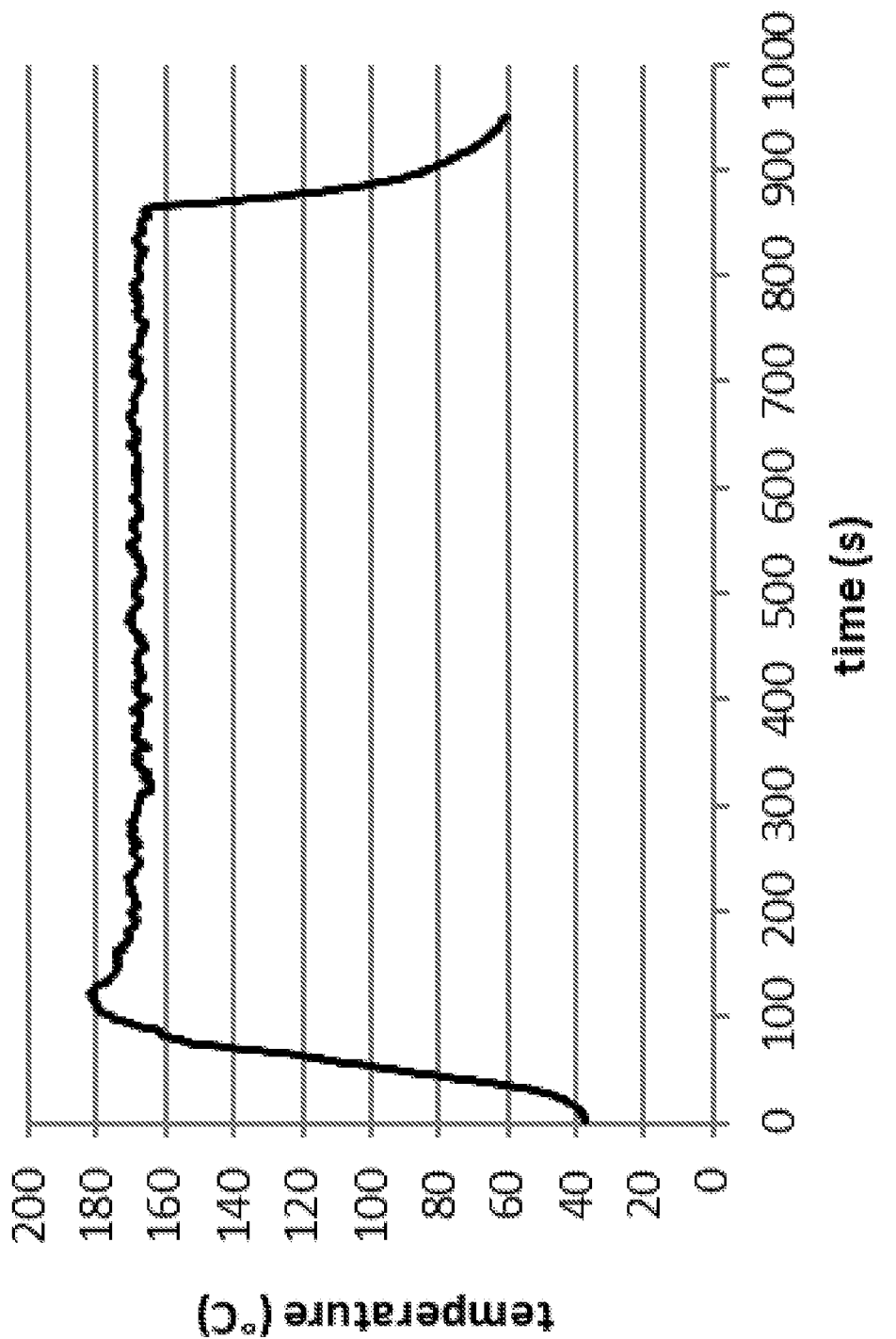
FIG. 8 depicts a temperature profile for a silver pivalate molecular ink on a PET substrate when sintered with broad spectrum UV light.
Figure 9:
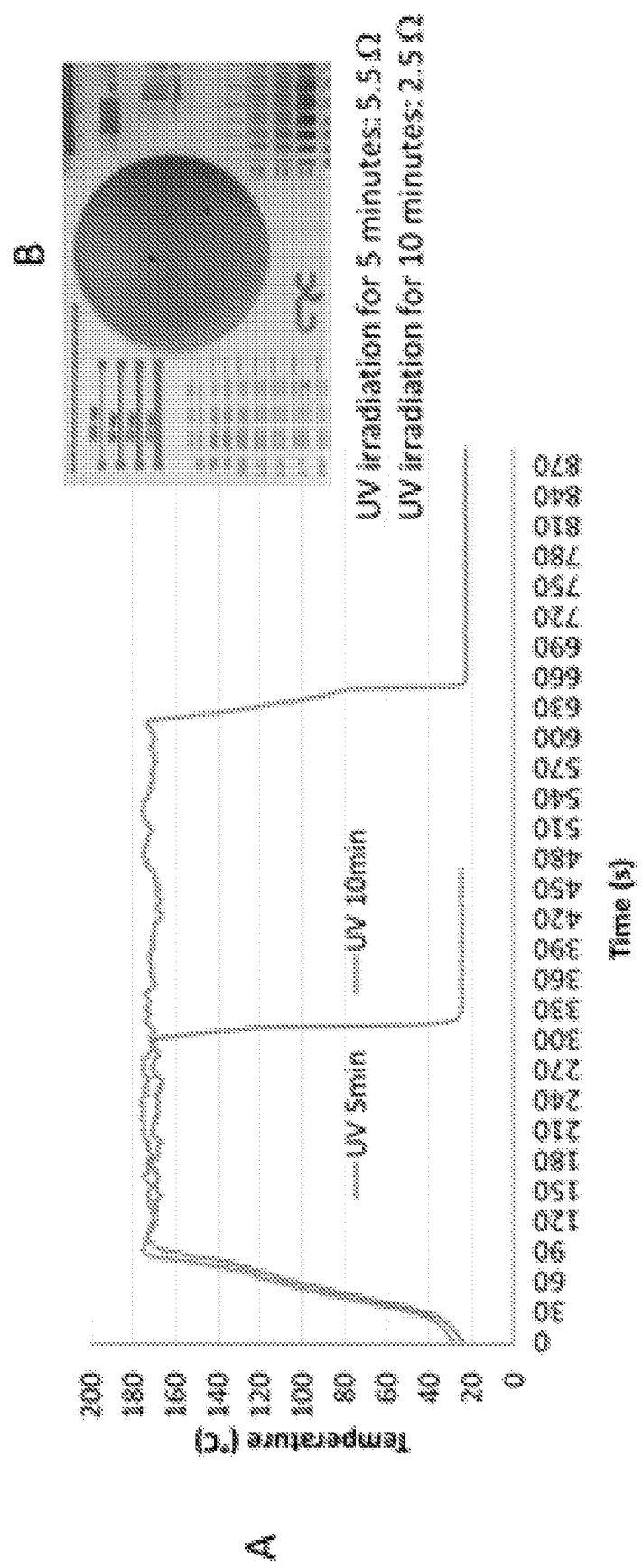
FIG. 9 depicts a temperature profile for a silver acetate ink (I7) on a PET substrate when sintered with broad spectrum UV light (Panel A) and the resistance measured across a 2 cm circle after 5 and 10 minutes of light exposure, respectively (Panel B).

As seen in FIG. 5 and FIG. 6, silver oxalate-based molecular silver inks when sintered with broad spectrum UV light heat rapidly (less than 60 seconds) to a peak maximum temperature after which the temperature declines somewhat and plateaus during the sintering process. This temperature profile is characteristic of the sintering of molecular silver inks and indicates a self-limiting mechanism whereby heat is localized in the trace to drive the conversion of silver precursor to silver without unduly heating parts of the substrate not covered with the trace. As seen in FIG. 8, the molecular ink (I6) containing silver pivalate rather than silver oxalate follows this kind of temperature profile when sintered with broad spectrum UV light. Interestingly, the temperature maximum reached for both silver pivalate (FIG. 8) and silver acetate (FIG. 9) are higher than that of the silver oxalate ink (about 180° C. vs. about 160° C.), indicating that the maximum temperature reached during the UV sintering is dictated by the silver salt in the ink.

Figure 10:
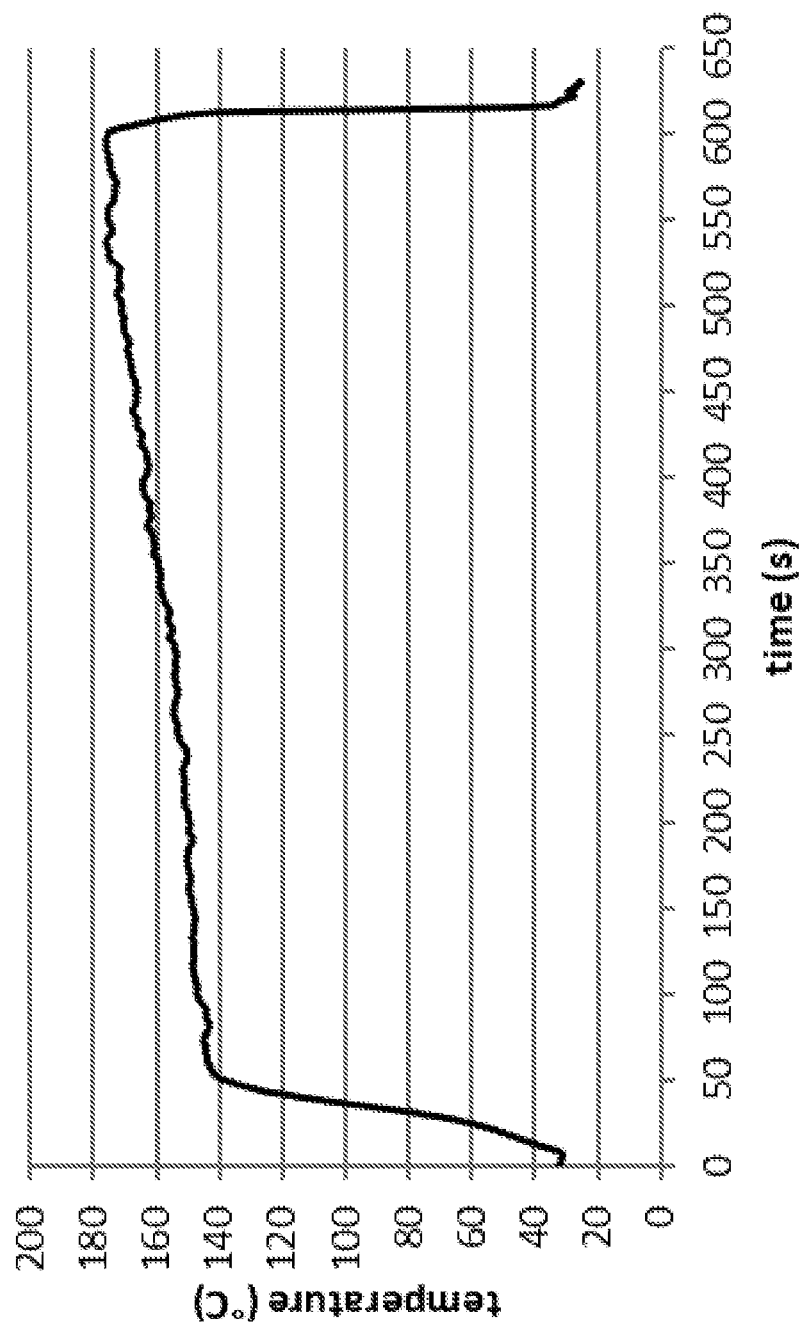
FIG. 10 depicts a temperature profile for a silver nanoparticle ink on a PET substrate when sintered with broad spectrum UV light.

In contrast, when a silver nanoparticle ink is sintered with broad spectrum UV light, the temperature profile, as seen in FIG. 10, does not exhibit an early peak with a decline then a plateau. Instead, the temperature of the trace rises rapidly initially and then continues to rise throughout the sintering process, albeit at a less rapid rate, indicating that the nanoparticle-based ink does not self-limit the heat, which can lead to over-heating the substrate. Further, traces of the silver nanoparticle ink sintered with broad spectrum UV light are highly resistive even after 10 minutes of UV exposure.

Example 7: UV Sintered Cu Traces Produced from Molecular Inks without Using Thermal Protecting Agents Low price, high conductivity and oxidation resistance are important targets for inks in printed electronics. Gold and silver are expensive but stable, i.e. resistant to oxidation. Compared to gold and silver, copper is cheaper and has a similar conductivity; however, the similar conductivity is often not achieved via printing and the copper is prone to oxidation, which reduces conductivity over time. The main types of copper inks used are metal nanoparticle-based inks, metal-organic decomposition (MOD) inks, copper flake inks and silver-coated copper flake inks. The majority of these Cu conductive inks requires nitrogen or reducing atmosphere during thermal sintering as well as required longer time for sintering.

Advantageously, printable inks are provided herein that can be sintered using broad spectrum UV light to produce oxidation resistant electrically conductive Cu traces on a low temperature substrate while reducing or eliminating damage to the substrate. Low cost copper inks that are screen-printable on low cost plastic i.e. PET and can be UV sintered would have immediate advantages for industrial or commercial application. Exemplary copper molecular inks and methods of making such inks suitable for UV processing (treatment and sintering) are disclosed in WO2018018136 and in Table 20 below.

The Cu molecular ink comprises an admixture of a copper nanoparticle, a copper precursor molecule, and a polymeric binder comprising a polyester, polyimide, polyether imide or any mixture thereof having surface functional groups that render the polymeric binder compatible with and/or soluble in a diol.

Copper nanoparticles (CuNP) are copper particles having an average size along a longest dimension in a range of about 1-1000 nm, preferably about 1-500 nm, more preferably about 1-100 nm. The copper nanoparticles, may be flakes, nanowires, needles, substantially spherical or any other shape. Copper nanoparticles can be formed by natural processes or through chemical synthesis, and are generally commercially available. The copper nanoparticles are preferably present in the ink in an amount of about 0.04-7 wt %, based on total weight of the ink. More preferably, the amount of copper nanoparticles is in a range of about 0.1-6 wt %, or about 0.25-5 wt %, or about 0.4-4 wt %. In one especially preferred embodiment, the amount is in a range of about 0.4 wt % to about 1 wt %.

The copper precursor molecule is a copper-containing compound that decomposes under sintering conditions to produce further copper nanoparticles in the conductive copper trace. The copper precursor molecule may be an inorganic compound (e.g. $CuSO_4$, $CuCl_2$, $Cu(NO_3)$, $Cu(OH)_2$), a copper metallo-organic compound (copper-MOD) or a mixture thereof. Copper-MODs include, for example, copper carboxylates (e.g. copper salts of a C1-C12 alkanoic acid, such as copper formate, copper acetate, copper propanoate, copper butanoate, copper decanoate, copper neodecanoate and the like), copper amines (e.g. bis(2-ethyl-1-hexylamine) copper (II) formate, bis(octylamine) copper (II) formate, tris(octylamine) copper (II) formate and the like), copper ketone complexes (e.g. copper (acetylacetone), copper (trifluoroacetylacetone), copper (hexafluoroacetylacetone), copper (dipivaloylmethane) and the like), copper hydroxide-alkanol amine complexes copper (II) formate-alkanol amine complexes and copper:aminediol complexes. The amino diol examples are 3-diethylamino-1,2-propanediol (DEAPD), 3-(dimethylamino)-1,2 propanediol (DMAPD), 3-methylamino-1-2-propanediol (MPD), 3-Amino-1,2-propanediol (APD) and 3-morpholino-1,2-propanediol.

The organic amine may be present in the ink in any suitable amount, preferably in 15 a range of about 10 wt % to about 75 wt %, based on total weight of the ink. More preferably, the amount is in a range of about 20 wt % to about 60 wt %, or about 25 wt % to about 55 wt %. In one especially preferred embodiment, the amount is in a range of about 40 wt % to about 45 wt %.

Copper:aminediol complexes are particularly preferred copper precursor molecules. Many copper:aminediol complexes are liquid at ambient temperature and are capable of acting as both copper precursor molecules and solvents. Further, copper:aminediol complexes interact favorably with the polymeric binder leading to superior conductive copper traces with respect to conductivity, mechanical strength and solderability. Particularly preferred copper:aminediol complexes are copper formate:aminediol complexes. In one embodiment, the copper:aminediol complex comprises a compound of Formula (I):

(I)

where R1, R2, R3 and R4 are the same or different and are NR5R6(R'(OH)2) or —O—(CO)—R", and at least one of R1, R2, R3 or R4 is NR5R6(R'(OH)2), wherein: R5 and R6 are independently H, C1-8 straight chain, branched chain or cyclic alkyl, C2-8 straight chain, branched chain or cyclic alkenyl, or C2-8 straight chain, branched chain or cyclic alkynyl; R' is C2-8 straight chain, branched chain or cyclic alkyl; and, R" is H or C1-8 straight chain, branched chain or cyclic alkyl.

In the compound of Formula (I), NR5R6(R'(OH)2) is coordinated to the copper atom through the nitrogen atom of the NR5R6(R'(OH)2). On the other hand, —O—(CO)—R" is covalently bonded to the copper atom through the oxygen atom. Preferably, one or two of R1, R2, R3 or R4 are NR5R6(R'(OH)2), more preferably two of R1, R2, R3 or R4 are NR5R6(R'(OH)2).

Preferably, R5 and R6 are independently H or C1-8 straight chain branched chain or cyclic alkyl, more preferably H or C1-8 straight chain or branched chain alkyl, yet more preferably H or C1-4 straight chain or branched chain alkyl. Examples of C1-4 straight chain or branched chain alkyl are methyl, ethyl, n-propyl, i-propyl, n-butyl, s-butyl and t-butyl. In a particularly preferred embodiment, R5 and R6 are H, methyl or ethyl.

Preferably R' is C2-8 straight chain or branched chain alkyl, more preferably C2-5 straight or branched chain alkyl. R' is preferably a straight chain alkyl. In a particularly preferred embodiment, R' is propyl. On a given R' substituent, the OH groups are preferably not bonded to the same carbon atom.

Preferably R" is H or C1-4 straight chain alkyl, more preferably H.

The copper precursor compound provides the balance of the weight of the ink after accounting for the copper nanoparticles, polymeric binder and any other inclusions in the ink. The copper precursor compound is preferably present in the ink in an amount of about 35 wt % or more, based on total weight of the ink. The amount of copper precursor compound may be about 45 wt % or more, or about 50 wt %.

The polymeric binder comprises a polyester, polyimide, polyether imide or any mixture thereof having surface functional groups that render the polymeric binder compatible with and/or soluble in a diol. Preferably, the surface functional groups comprise polar groups capable of participating in hydrogen bonding. The surface functional groups preferably comprise one or more of hydroxyl, carboxyl, amino and sulfonyl groups. The polymeric binder may be present in the ink in any suitable amount. Preferably, the polymeric binder is present in the ink in an amount of about 0.04-0.8 wt %, based on total weight of the ink. More preferably, the amount of polymeric binder is in a range of about 0.08-0.6 wt %, even more preferably about 0.25-1 wt %, yet even more preferably about 0.25-0.4 wt %, for example about 0.3 wt %.

The polymeric binder preferably comprises a polyester. Suitable polyesters are commercially available or may be manufactured by the condensation of poly alcohols with poly carboxylic acid and respectively their anhydrides. Preferred polyesters are hydroxyl and/or carboxyl functionalized. The polyester may be linear or branched. Solid or liquid polyesters as well as diverse solution forms may be utilized. In a particularly preferred embodiment, the polymeric binder comprises a hydroxyl- and/or carboxyl-terminated polyester, for example Rokrapol™ 7075.

The ink may be formulated by mixing the copper nanoparticles, copper precursor molecule and polymeric binder together. Mixing may be performed with or without an additional solvent. Preferably, the copper precursor molecule is a liquid and can act as a solvent in addition to being a precursor to copper metal formation. However, in some embodiments an additional solvent may be desired. The additional solvent may comprise at least one aqueous solvent, at least one aromatic organic solvent, at least one non-aromatic organic solvent or any mixture thereof, for example water, toluene, xylene, anisole, diethylbenzene, alcohols (e.g. methanol, ethanol), diols (e.g. ethylene glycol), triols (e.g. glycerol) or any mixture thereof. Additional solvent may comprise about 0.5-50 wt % of the ink, based on total weight of the ink, more preferably about 1-20 wt %.

While the ink may be formulated for any kind of depositing, the ink is particularly suited for screen printing. In this regard, the ink preferably has a viscosity of about 1,500 cP or greater, more preferably about 1,500-10,000 cP or 4,000-8,000 cP, for example about 6,000 cP.

Figure 11:
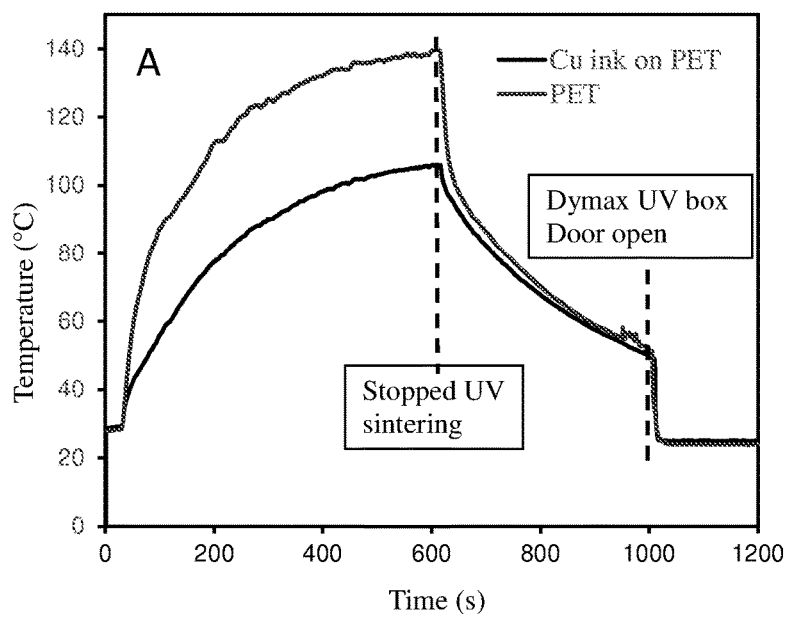
FIG. 11A) UV sintering thermal profile of Cu molecular ink on PET substrate using DYMAX™ 5000-EC Series UV curing Flood lamp system at a distance 10 cm from the bulb for 10 minutes (intensity 46.14 J/cm$^2$—total dose; or 4.614 J/cm2 per minute. A thermocouple is taped to the bottom of the PET under the trace (1 cm square) and temperature is monitored over time. Photographs of UV sintered conducting Cu traces: B) tape mask printed Cu squares and C) screen printed Cu traces on PET substrate.
Figure 11:
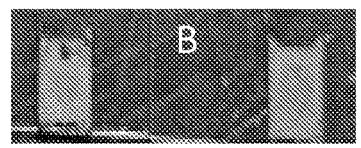
Figure 11:
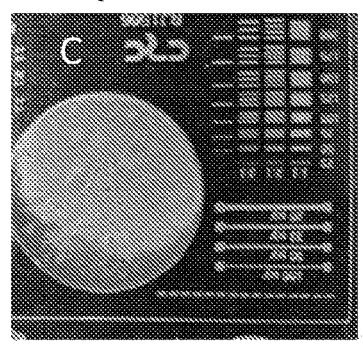
Figure 12:
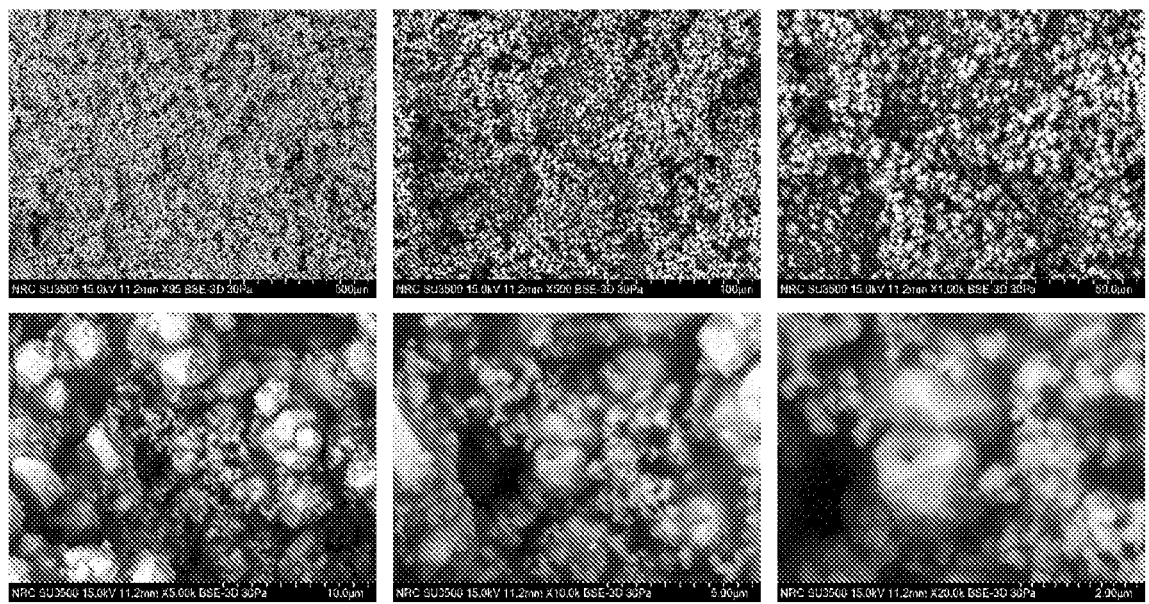
FIG. 12 Scanning electron micrograph (SEM) images of UV sintered Cu trace. Tape mask printed Cu square sintered using DYMAX™ 5000-EC Series UV curing Flood lamp system at a distance 10 cm from the bulb for 10 minutes (intensity 46.14 J/cm$^2$—total dose; or 4.614 J/cm2 per minute). A dense granular metal structure throughout the trace is observed.
Figure 13:
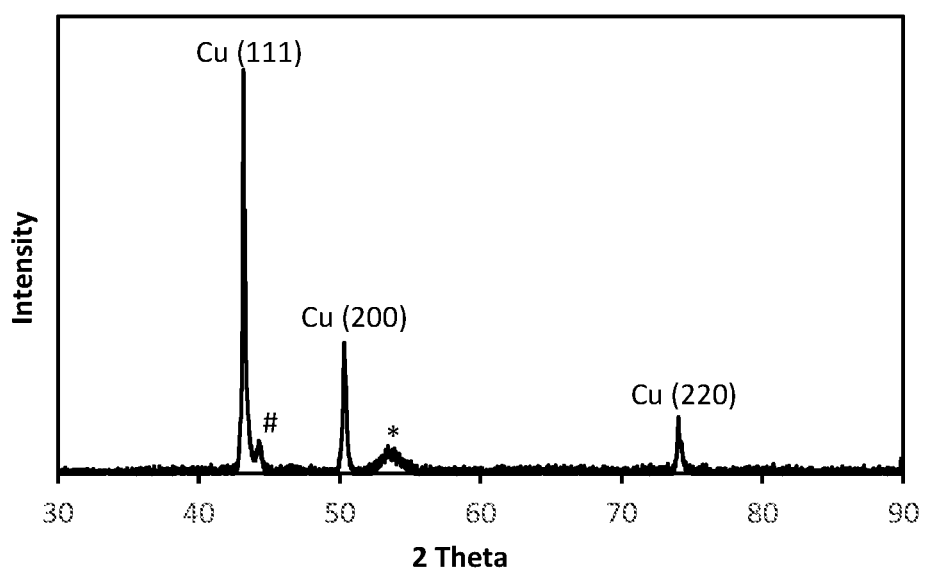
FIG. 13 XRD pattern UV sintered Cu trace on PET substrate. The small peak* attributed to the substrate PET and #artifact from sample holder. XRD measurements of the Cu trace on PET were made with a Bruker D8 Advance X-ray diffractometer equipped with a sealed Cu tube source. Scans were performed with a 2θ range from 30-90°. XRD analysis of UV sintered trace seen in this indicates that the reduction of Cu MOD ink to metallic Cu occurs without the formation of copper oxide.

With reference to Table 21 and FIGS. 11-13, an exemplary Cu ink comprises a Cu formate; an organic amine compound; fractional amount of CuNP as a filler (2.4% to the total amount of Cu in the ink) and a binder. Advantageously, the ink of the present invention can be printed on a low temperature substrate and sintered using broad spectrum UV light to produce electrically conductive traces on the low temperature substrate while reducing or eliminating damage to the substrate. Sintering time is preferably 20 minutes or less, more preferably about 15 minutes or less. In one embodiment the traces are sintered for about 1-15 minutes to obtain conductive copper traces. In another embodiment the traces are sintered for about 3-10 minutes to obtain conductive copper traces. In still another embodiment the traces are sintered for about 8-10 minutes.

The conductive traces produced by sintering the ink with broad spectrum UV light according to the methods of the present disclosure have trace morphologies similar to those of thermally processed samples and have comparable electrical properties as shown in FIG. 12 at different magnifications. XRD data indicates that the reduction of Cu MOD ink to metallic Cu occurs without oxide formation (see FIG. 13). More particularly, the XRD measurements of the Cu trace on PET were made with a Bruker D8 Advance X-ray diffractometer equipped with a sealed Cu tube source. Scans were performed with a 2θ range from 30-90°. XRD analysis of UV sintered trace seen in FIG. 13 indicates that the reduction of Cu MOD ink to metallic Cu occurs without oxide formation. Three peaks at 2theta values of 43.64, 50.80, and 74.42 deg corresponding to (111), (200), and (220) planes of copper have been observed. There is a small peak* attributed to the substrate PET and #artifact from the sample holder.

In this case, the reagent that can assist in the photoreduction of the copper formate on PET and on Kapton is amino diol i.e. (3-(Diethylamino)-1,2-propanediol). UV sintering of Cu inks formulated with an alkylamine (octylamine or ethyl-hexyl amine) does not initiate photoreduction and traces go black with longer exposures (~30 min) suggesting oxidation of Cu traces. These results suggest that the amino diol is particularly suited for UV sintering. The first advantage of the amino diol is the lowering of the decomposition temperature of the Cu formate/amino diol complex. Second, the hydroxyl groups from amino diol prevent penetration of oxygen during sintering and prevent oxidation. The amino diol have the greater tolerance towards the presence of trace amounts of oxygen during sintering compared to other amine ligands.

TABLE 21

Cu molecular ink without thermal protecting agent

| Component | Purpose of addition | Mass (g) | % by weight |
|---|---|---|---|
| Cu Formate anhydrous | Cu precursor | 5.0 | 42.63 |
| 3-(Diethylamino)-1,2-propanediol | Amine | 1.46 | 12.45 |
| $H_2O$ | Solvent | 5.18 | 44.17 |
| Cu Nanoparticles | Filler | 0.05 | 0.43 |
| Rokrapol 7075 | Binder | 0.0375 | 0.32 |

Example 8: UV Treated Ag Traces Produced from Molecular Inks without Thermal Protecting Agent Thermoformed electronics use traditional and improved printing processes to print functional inks on flat (2D) substrates which can be thermoformed into 3D shapes and subsequently injection molded to produce the final functional, lightweight and lower cost "part". The success of this process hinges on conductive inks that survive thermoforming, where conductors must withstand elongations >25% and draw-depths (changes in the "z-direction") up to 1 cm without a significant loss or change in measured resistance of the traces. In this example, Ink C1 (a formulation of a screen printable ink that comprises silver oxalate, 1-amino-2-propanol/2-amino butanol or a variation which does not contain 1-amino butanol (in either case to solubilize the silver oxalate salt and reduce its decomposition temperature), a cellulose polymer (to act as a rheology modifier and binder) and dipropylene glycol monomethyl ether (to act as a solvent carrier) is tested for the advantages of drying or curing using broad band UV light.

Following the screen printing of the ink onto industrially-relevant polycarbonate substrates, the resulting traces can be treated using UV light and subsequently sintered in-situ (e.g. thermally) as they are thermoformed to yield conductive traces that have local elongations as high as 25% with a resistance increases as small as 11% and resistivity values as low as 14 $\mu\Omega$·cm (5.4 m$\Omega$/$\square$/mil). The ability to produce functional traces following thermoforming enabled the development of a proof-of-concept 3D capacitive touch HMI interface driven by an external processor that can illuminate 3 individually addressable LEDs.

The ink was prepared according to methods disclosed in WO 2018/146616, which is herein incorporated by reference in its entirety. First a cellulose polymer binder was dissolved in a dipropylene glycol monomethyl ether to produce the ink carrier. Following dissolution of the cellulose polymer, a surface tension modifier, a defoaming agent and 1-amino-2-propanol (or a mixture of 1-amino-2-propanol/2-aminobutanol) were added to the carrier and mixed in a centrifugal mixer for 2 minutes. Finally, silver oxalate is added to the carrier and again mixed in the centrifugal mixer to produce the ink. Thermogravimetric analysis (TGA) analysis of the ink indicates that the silver metal content of the ink is ~23%. The viscosity of the inks was measured with a Brookfield DV3T rheometer fitted with an SC4-14 small sample adapter and found to shear thin under stress and had a viscosity of ~6000 cP.

The molecular ink was screen printed onto 8.5×11" sheets of Lexan 8010 (referred to as PC-8010) using an S-912M small format screen printer through patterns photo-imaged onto MIM emulsion (22-24 µm) supported on a SS400 stainless steel mesh (MeshTec, Illinois). For the samples processed via the DYMAX 5000-EC Series UV Curing Flood Lamp system, the printed traces were placed on top of a platform placed 20 cm from the lamp and exposed to the UV light immediately when the lamp was powered on. The light energy measured from the lamp with an AccuXX light meter indicates the energy is 3.232 J/cm$^2$ per minute. For the samples processed with the UV conveyer system, a 6 foot dual lamp conveyer system from American UV was utilized (C12/300/2 12"). The conveyer was fitted with gallium- and iron-doped halogen bulbs and the intensity for a single pass under the lamps at 35 feet/minute produce the light doses presented in Table 22.

TABLE 22

The UV doses for UVA, UVB, UVC and UVV light from the UV conveyer system, a 6 foot dual lamp conveyer system from American UV was utilized (C12/300/2 12") fitted with both gallium- and iron-doped halogen bulbs following a single pass under the lamps at 35 feet/minute.

| Light | wavelength | dose |
|---|---|---|
| UVA | 320-395 | 867 ± 9 |
| UVB | 280-320 | 554 ± 3 |
| UVC | 250-280 | 130 ± 1 |
| UVV | 395-455 | 1788 ± 5 |

The Topographical surface characterization of the traces was done using a Cyber TECHNOLOGIES CT100 optical profilometer fitted with a vacuum chuck and a white light sensor (cyberTECHNOLOGIES GmbH, Germany). The 3D images were acquired with 1 µm steps to ensure accuracy. The thickness and linewidths were all determined using the SCANSUITE software supplied with the profilometer. Thermoforming was carried out with a Formech 450DT tabletop vacuum forming machine comprised of a vacuum table positioned below an overhead oven. Molecular inks printed on Lexan 8010 were thermoformed using a thermal profile that exposes the traces to 180-190° C. for ~90 seconds before the traces were thermoformed onto an oval object positioned over a vacuum table.

Following formulation and screen printing of the silver oxalate-based molecular ink onto Lexan 8010, the substrate was fitted into a Formech thermoforming machine (https://formechinc.com/product/300xg/) and heated to temperatures of 180-190° C. for 60-70 seconds in order to soften the substrate. It should be noted that exposure of the silver oxalate-based traces to these temperatures, even for this short duration of time, produces conductive traces in situ. Following softening, the PC substrate is thermoformed by pulling it over a template object (in this case a domed oval) supported on a vacuum table and as the substrate cools, the 3D shape is frozen into the substrate resulting in the production of 3D conductive silver traces.

The location and magnitude of the substrate elongation was measured by drawing a grid on the substrate prior to thermoforming and measuring the changes in the dimensions of the grid following thermoforming. When the silver oxalate-based ink is printed and immediately thermoformed conductive traces cannot be produced. In contrast, when the printed traces are treated with UV light from a flood lamp based system (DYMAX 5000-EC Series UV Curing Flood Lamp system) or a dual lamp UV conveyer system (American UV C12/300/2 12" conveyer, fitted with gallium-doped and iron-doped metal halide lamps), conductive thermoformed traces are produced.

Figure 14:
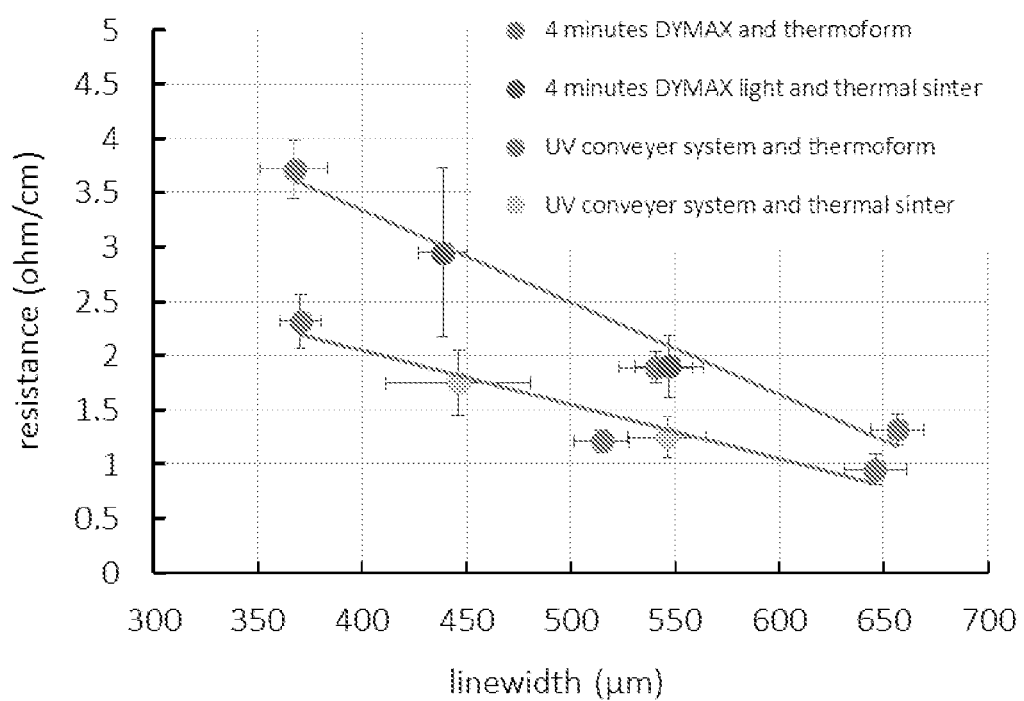
FIG. 14 Plots of the resistance vs. line width for 3D linear traces thermoformed following UV treatment with the DYMAX flood lamp system (blue circles and blue trend line; see upper trend line) and the UV conveyer system (green circles and green trend line; see lower trend line) in comparison to traces that are subjected to the same treatment in the absence of thermoforming, where the DYMAX flood lamp system treated samples are presented as red circles and those for the UV conveyer system are presented as yellow circles.

Comparison of the relative resistance of the thermoformed traces in comparison traces exposed to the same conditions without the thermoforming step was carried out by thermoforming part of a test trace and exposing a control portion of the test trace to the same UV treatment and thermal conditions, but the traces were not thermoformed. As highlighted in FIG. 14, a trend line fit to the resistance vs. line width of the thermoformed traces (blue/darker and green/lighter circles) overlays above and quite well with the resistance vs line width for control traces that are not thermoformed (red/darker and yellow/lighter circles respectively). We estimate that the change in resistance following thermoforming is ~5% for the UV treated traces (see FIG. 14).

Figure 15:
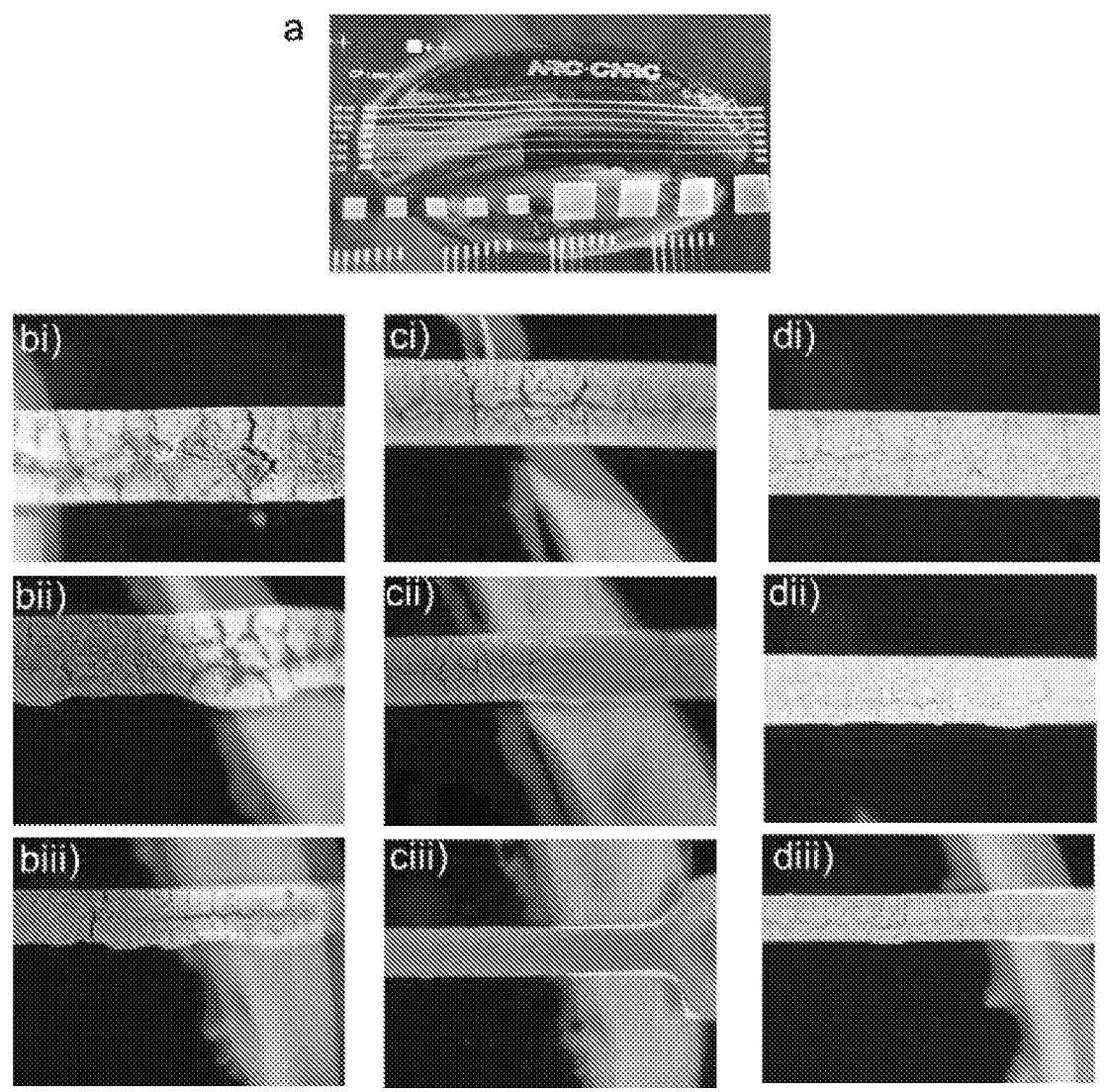
FIG. 15 A photograph of the linear traces thermoformed over the 1 cm high domed shape (a) and a zoom in of the three widest traces highlighted in the yellow rectangle to the upper right corner of the 'a' panel. Note that the traces produced by thermoforming only are cracked (bi-iii), whereas those treated with UV light from the DYMAX flood lamp system (ci-iii) and the UV conveyer system (di-iii) are much less susceptible to cracking.

Microscopic analysis of the traces stretched during the thermoforming process indicated that there was significant cracking throughout the traces in the absence of UV treatment (FIG. 15*bi*, bii, biii), resulting in largely nonconductive thermoformed traces. Treatment of the silver oxalate ink with UV light from a flood lamp based system (FIG. 15*ci*, cii and ciii) or a dual lamp UV conveyer system (FIG. 16*di*, dii and diii) minimizes cracking of the traces, resulting in the production of conductive 3D silver traces.

Figure 16:
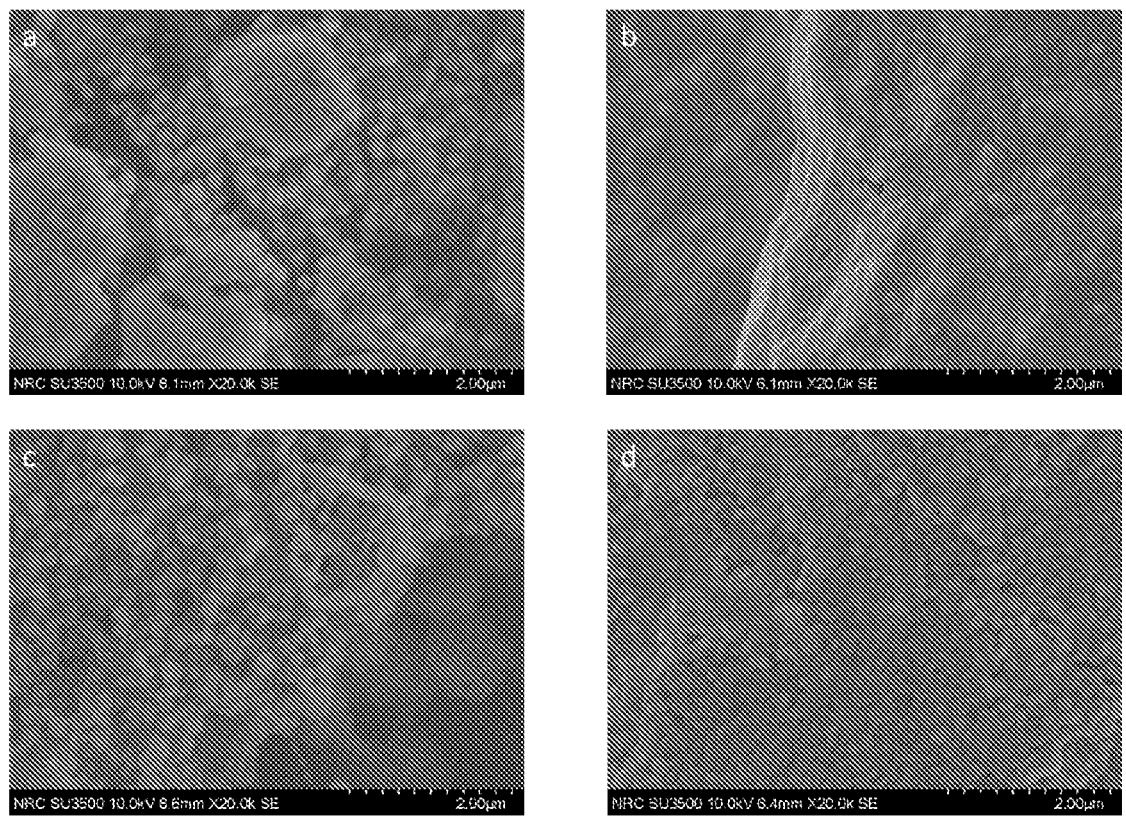
FIG. 16 SEM images of the silver oxalate-based molecular ink where the screen printed ink has been UV light treated with the DYMAX flood light system (a) or the UV conveyer system (b) to initiate the formation of silver nanoparticles. Following UV treatment, the traces are thermoformed to produce conductive silver films that comprise interconnected silver nanoparticles. The traces produced following treatment with the DYMAX flood light system have slightly larger particles and are less coalesced (c) than those produced in the traces treated with the UV conveyer system (d).
Figure 18:
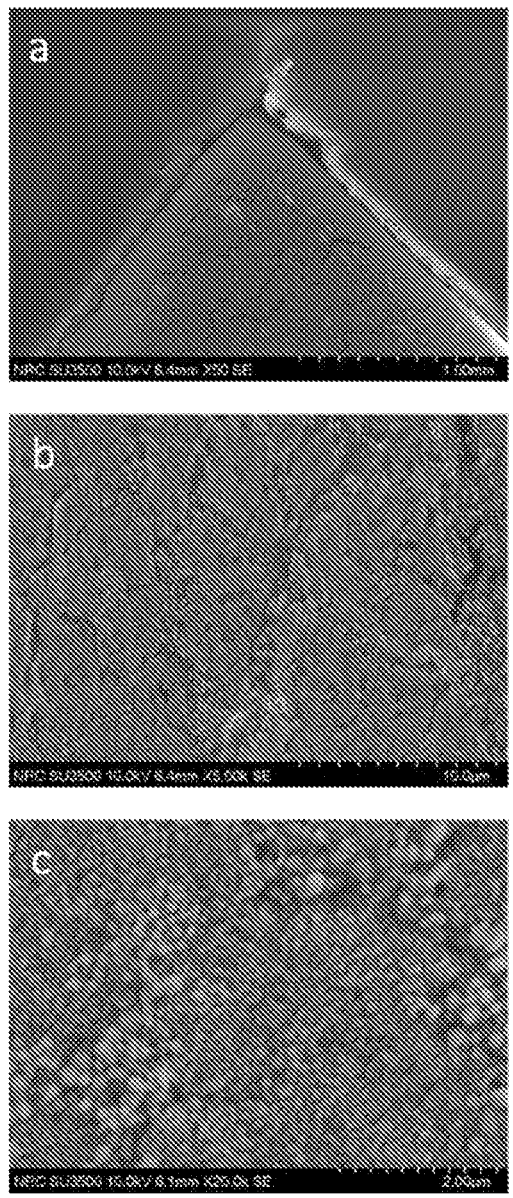
FIG. 18 An SEM image of the thermoformed traces produced from the direct thermal sinter without UV treatment. Note that voids and cracks are present where larger silver nanoparticles are present and that the areas where the nanoparticles are smaller are uniform.

To elucidate what effect the UV treatment has on the ability to thermoform the silver oxalate ink the UV treated traces were analyzed by XRD. This analysis indicates that treatment of the silver oxalate ink with UV light from both the flood lamp and UV conveyer systems initiate the conversion of the silver salts to metallic silver. Further analysis of the UV treated traces with scanning electron microscopy (SEM) indicates UV treatment transforms the molecular ink to silver nanoparticles (FIG. 16). Interestingly, the nanoparticles appear to be of smaller diameter when produced through the use of the UV curing machine rather than the DYMAX 5000-EC Series UV Curing Flood Lamp system. This is likely due to the fact that the UV conveyer system exposes the traces to a much higher dose of energy over a shorter time (UVV: 1.8 J/cm$^2$ per second, UVA: 0.9 J/cm$^2$ per second) in comparison to the flood lamp system (3.2 J/cm$^2$ per minute, 0.053 J/cm$^2$ per second). This intense exposure to the UV light then can produce a large number of silver (0) atoms that presumably nucleate a large number of small silver nanoparticle. SEM analysis of the thermoformed traces also suggests that the smaller silver nanoparticles produced from treatment of the traces by the intense light produced from the UV conveyer coalesce into a more interconnected network than the larger nanoparticles produced following UV treatment by the DYMAX flood lamp system. SEM analysis of the traces that are directly thermoformed without any UV treatment are comprised of a non-uniform distribution of silver nanoparticles, where the silver traces are mainly composed of small silver nanoparticles that are well interconnected, but there are many larger diameter particles that do not coalesce. The larger particles act as defects in the trace and are likely the sites where the traces crack as they are thermoformed (see FIG. 18). It is likely that the rapid heating of the ink to 180-190° C. leads to concurrent silver nanoparticle formation and solvent/amine evaporation. When the amine evaporates and is no longer chelated to the silver oxalate salt it is less soluble in the carrier solvent and it has a higher decomposition temperature. This results in silver traces containing nanoparticles that grow unevenly and that become cracked and nonconductive.

Together, this data suggests that initiating the formation of these small nanoparticles via UV treatment is a factor in the formation of a uniform, crack-free and conductive thermoformed traces. It should be noted that both the DYMAX flood lamp system and the UV conveyer system expose the traces to UVA light (320-395 nm), which can cure deep areas of traces to improve adhesion. In addition, the gallium-doped bulb UV conveyer system exposes the traces to UVV light, which should penetrate to the deepest areas of the traces near the ink/substrate interface.

Figure 17:
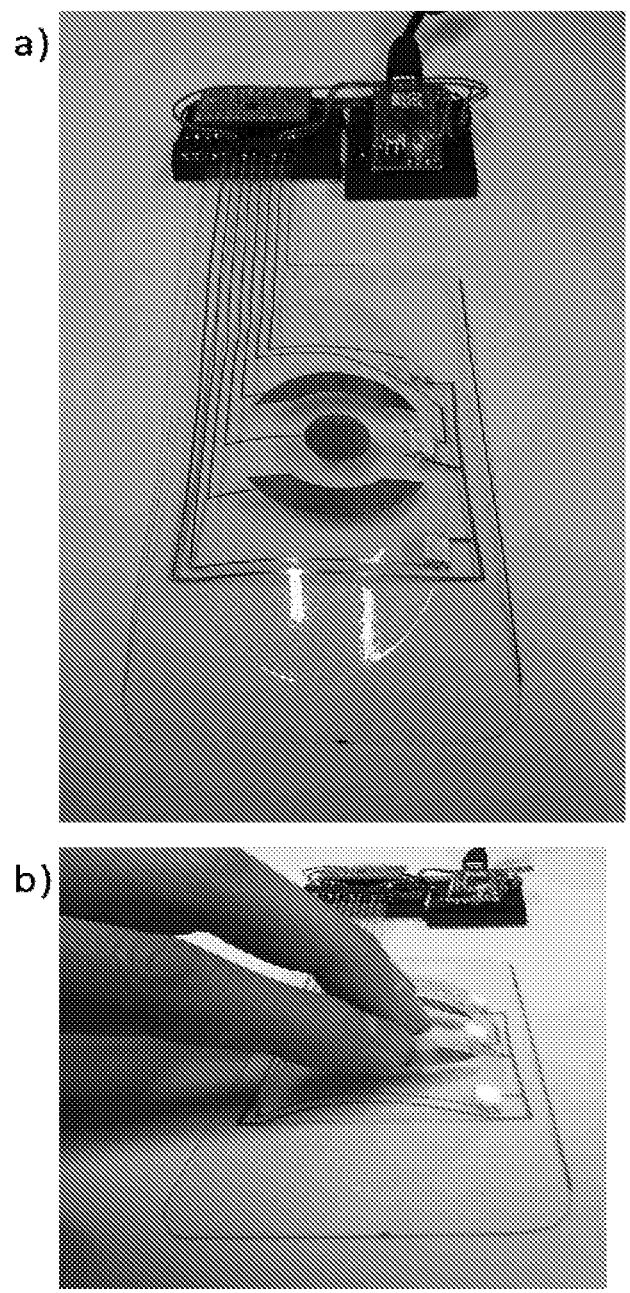
FIG. 17 A photograph of the linear traces of a thermoformed capacitive touch HMI circuit that has been thermoformed and attached to an Arduino Micro with an MPR121 Capacitive Touch Sensor Breakout (a) and an example of the illumination of 3 LEDs that have been attached to the surface of the circuit using conductive silver epoxy (b).

To demonstrate the utility of the thermoforming process and the ability to use UV treatment to produce uniform, crack-free conductive silver circuits, a 3 button capacitive touch-based Human-Machine Interface (HMI) switch driven by an Arduino Micro with an MPR121 Capacitive Touch Sensor Breakout board was designed that could be printed in 2D and subsequently thermoformed into the 1 cm high 3D structure (FIG. 17). In contrast to the linear traces studies above, the capacitive touch circuit is more complex with traces printed in both vertical and horizontal orientations. Again UV treatment of the as-printed molecular ink enables the production of a functional circuit, whereas untreated traces tend to crack and become non-conductive. A summary of the results are presented in Table 23, where treatment with the UV curing machine and DYMAX systems are shown to produce traces with lower measured resistances in comparison to the samples treated with the flood lamp system (2.0 and 2.6 Ω/cm). The relative resistance increase for the thermoformed traces in comparison to control traces that are subjected to the same processing conditions but not thermoformed is 10% and 20% for the UV conveyer and DYMAX systems, respectively. Analogous to the examples for the linear traces presented above, it has been demonstrated that the UV treatment of the traces enables the traces to undergo elongation without cracking. With conductive thermoformed traces produced from the silver-oxalate-based ink, LEDs were fixed to the traces using conductive silver epoxy and allowed to dry for several hours (FIG. 17*a*). The result is a capacitive touch circuit with three individually addressable touch circuits that illuminate as they are touched that demonstrates how a 3D circuit can be produced from this combination of the molecular ink, LEDs and an Arduino Micro/capacitive touch breakout board. It is thus demonstrated that HMI switches (touch circuits) can be produced through the industry-relevant additive manufacturing processes (screen printing, thermoforming and pick and place technologies) and improved through the use of an industry relevant UV treatment process. The development of products making use of techniques and equipment already used within the HMI industry has the potential to innovate the way that touch interfaces and controls are produced.

We also compared the performance of the molecular inks to a commercially available silver flake ink modified with elastomeric polymers designed for thermoforming applications. As highlighted in the Table 23, both the measured resistance and resistivity of the UV treated and thermoformed traces produced from the molecular ink is better than that of the non-thermoformed commercially available ink exposed to the same processing conditions. It is also noteworthy that we achieve this performance with the molecular inks despite the fact that they are ~3 times thinner than the traces produced from the commercially available flake ink. This is likely due to the fact that in order to be thermoformable, the commercially available inks have large proportions of elastomeric polymers added to the formulation to facilitate elongation. The presence of this polymer improves the stretchability of the traces, but simultaneously decreases the resistivity of the resulting traces. In the case of the molecular inks presented here, we can take advantage of the UV treatment to impart stretchability and the addition of extra polymers is not required, so the resistivity of the thermoformed traces remains low.

TABLE 23

A tabulated comparison of the measures resistance, trace height and calculated sheet and volume resistivities for the silver oxalate-based molecular ink in comparison to a commercially available thermoformable ink. Note that the commercial thermoformable ink has not been thermoformed, it has only been thermally cured as a 2D trace.

| Ink | Resistance (Ω/cm) | treatment | Height (μm) | Sheet resistivity (mΩ/□/mil) | Volume resistivity (μΩ · cm) |
|---|---|---|---|---|---|
| Silver oxalate-based molecular ink | 2.1 ± 0.4 | UV conveyer | 1.1 ± 0.2 | 5.4 ± 0.6 | 13.8 ± 1.6 |
| Silver oxalate-based molecular ink | 2.6 ± 0.4 | DYMAX UV Flood lamp | 1.1 ± 0.3 | 6.1 ± 1.1 | 15.5 ± 2.8 |
| Commercially available ink | 2.6 ± 0.7 | none | 5.2 ± 0.5 | 26.7 ± 2.6 | 66.7 ± 6.6 |

In summary, use of a PC-compatible screen-printable silver oxalate molecular ink can be incorporated into the development of thermoformed electronics, where a simple UV treatment process enables traces to remain conductive following elongations up to 1.3×, enabling the development 3D circuits from 2D printed sheets through industry relevant manufacturing processes. The application of UV treatment may also be applied in injection molding processes to further enable the incorporation of the molecular inks into injection molded structures to make thermoformed circuits and other thermoformed electronics, specifically due to the fact that the ink can be sintered during the thermoforming process, in particular when PC and like substrates used in thermoforming are heated to higher temperatures to facilitate the shaping of parts. These methods of processing will enable the development of more structurally complex devices and provide more design freedom in the production of human-machine interfaces in the automobile, aerospace and appliances industries.

By way of additional summary, Table 24 provides a comparative analysis of the performance of ink C1 following UV treatment on polycarbonate substrate prior to thermoforming, highlighting that without UV treatment the traces crack during the thermoforming process. UV sintering was performed using a DYMAX 5000-EC Series UV Curing Flood Lamp system and curing was done using an American UV C12/300/2 12" conveyer, with gallium-doped and iron-doped halogen lamps.

TABLE 24

A comparative analysis of the performance of ink C1 following UV treatment with the DYMAX system and UV conveyer systems in comparison to thermal treatment only.

| UV light exposure tool | Dose (mJ/cm²) | Time (s) | Cracks during thermoforming? | Relative resistance increase compared to non-thermoformed traces |
|---|---|---|---|---|
| None | — | — | Yes | Not conductive, cracked |
| DYMAX | UVA: 12.8 | 240 | Very little | ~5% |
| UV curing machine | UVV: 5.4VA: 2.7 | 3 | None | ~5% |

The novel features will become apparent to those of skill in the art upon examination of the description. It should be understood, however, that the scope of the claims should not be limited by the embodiments, but should be given the broadest interpretation consistent with the wording of the claims and the specification as a whole.

REFERENCES

[1] J. F. Salmerón, F. Molina-Lopez, D. Briand, J. J. Ruan, A. Rivadeneyra, M. A. Carvajal, L. F. Capitán-Vallvey, N. F. De Rooij, A. J. Palma, *J. Electron. Mater.* 2014, 43, 604.
[2] X. Cao, H. Chen, X. Gu, B. Liu, W. Wang, Y. Cao, F. Wu, C. Zhou, *ACS Nano* 2014, 8, 12769.
[3] R. Hoenig, A. Kalio, J. Sigwarth, F. Clement, M. Glatthaar, J. Wilde, D. Biro, *Sol. Energy Mater. Sol. Cells* 2012, 106, 7.
[4] J. Liang, K. Tong, Q. Pei, *Adv. Mater.* 2016, 28, 5986.
[5] A. E. Ostfeld, I. Deckman, A. M. Gaikwad, C. M. Lochner, A. C. Arias, *Sci. Rep.* 2015, 5, 15959.

[6] A. J. Kell, C. Paquet, O. Mozenson, I. Djavani-Tabrizi, B. Deore, X. Liu, G. P. Lopinski, R. James, K. Hettak, J. Shaker, A. Momciu, J. Ferrigno, O. Ferrand, J. X. Hu, S. Lafrenière, P. R. L. Malenfant, *ACS Appl. Mater. Interfaces* 2017, acsami.7b02573.

[7] S. B. Walker, J. A. Lewis, *J. Am. Chem. Soc.* 2012, 134, 1419.

[8] M. Vaseem, G. McKerricher, A. Shamim, *ACS Appl. Mater. Interfaces* 2016, 8, 177.

[9] X. Nie, H. Wang, J. Zou, *Appl. Surf. Sci.* 2012, 261, 554.

[10] Y. Chang, D.-Y. Wang, Y.-L. Tai, Z.-G. Yang, *J. Mater. Chem.* 2012, 22, 25296.

[11] Y. Dong, X. Li, S. Liu, Q. Zhu, J.-G. Li, X. Sun, Thin Solid Films 2015, 589, 381.

[12] C. Paquet, T. Lacelle, X. Liu, B. Deore, A. J. Kell, S. Lafrenière, P. R. L. Malenfant, *Nanoscale* 2018, 10, 6911.

[13] C. Paquet, T. Lacelle, B. Deore, A. J. Kell, X. Liu, I. Korobkov, P. R. L. Malenfant, *Chem. Commun.* 2016, 52, 2605.

[14] K. Gilleo, *Polymer Thick Film: Today's Emerging Technology for a Clean Environment Tomorrow*; Springer, 1996.

The invention claimed is:

1. An ink comprising: a silver carboxylate or a copper carboxylate; an organic amine compound comprising an amino alcohol; and, a thermal protecting agent comprising a poly(fluorene), a poly(thiophene) or any mixture thereof, wherein the poly(fluorene) comprises a polymer of formula (I):

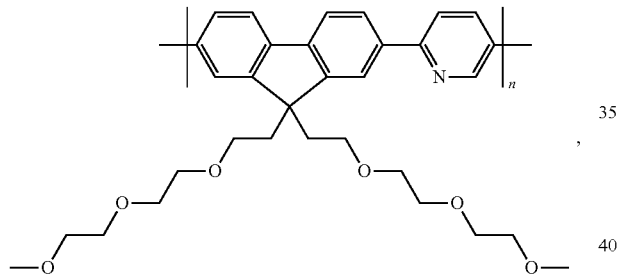

and the poly(thiophene) comprises a polymer of formula (II):

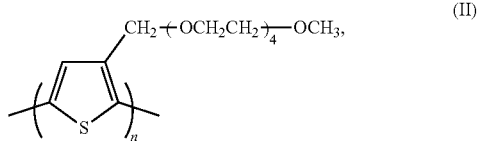

where n is an integer from 5-2000, wherein the ink self-limits heating observed during UV sintering, thereby localizing heat to an area on a substrate occupied by the ink.

2. The ink of claim 1, wherein the silver carboxylate or copper carboxylate has a thermal decomposition temperature of 160° C. or less.

3. The ink of claim 1, wherein the silver carboxylate is a $C_{1-10}$ alkanoate, or where the copper carboxylate is a $C_{1-12}$ alkanoate.

4. The ink of claim 1, wherein the silver carboxylate is silver oxalate, silver acetate or silver pivalate.

5. The ink of claim 1, further comprising one or more of an organic polymer binder, a surface tension modifier, a solvent, a defoaming agent and a thixotropy modifying agent.

6. The ink of claim 1 comprising: the silver carboxylate, the silver carboxylate comprising silver oxalate, silver pivalate or silver acetate; lactic acid surface tension modifier; and, the thermal protecting agent.

* * * * *